United States Patent
Osaka et al.

(10) Patent No.: US 6,842,104 B1
(45) Date of Patent: Jan. 11, 2005

(54) SYSTEM LSI AND A CROSS-BUS SWITCH APPARATUS ACHIEVED IN A PLURALITY OF CIRCUITS IN WHICH TWO OR MORE PAIRS OF A SOURCE APPARATUS AND A DESTINATION APPARATUS ARE CONNECTED SIMULTANEOUSLY AND BUSES ARE WIRED WITHOUT CONCENTRATION

(75) Inventors: Masataka Osaka, Katano (JP); Tsutomu Sekibe, Neyagawa (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/526,154

(22) Filed: Mar. 15, 2000

(30) Foreign Application Priority Data

Mar. 19, 1999 (JP) .......................................... 11-075203

(51) Int. Cl.⁷ .......................... H03K 17/00; G06F 13/00
(52) U.S. Cl. ....................... 340/2.28; 340/2.1; 340/2.2; 340/2.29; 710/317
(58) Field of Search ............................... 340/2.28, 2.1, 340/2.2, 2.29; 710/317

(56) References Cited

U.S. PATENT DOCUMENTS

| | | | |
|---|---|---|---|
| 4,014,005 A | * | 3/1977 | Fox et al. .................... 710/317 |
| 4,191,941 A | * | 3/1980 | Springer et al. ............. 340/2.2 |
| 4,953,081 A | * | 8/1990 | Feal et al. .................... 710/111 |
| 5,309,426 A | | 5/1994 | Crouse et al. |
| 5,995,439 A | * | 11/1999 | Watanabe et al. ....... 365/189.08 |
| 6,075,829 A | * | 6/2000 | Hayashi et al. ............. 329/304 |
| 6,208,644 B1 | * | 3/2001 | Pannell et al. .............. 370/389 |

FOREIGN PATENT DOCUMENTS

JP          5197696          8/1993

* cited by examiner

Primary Examiner—Brian Zimmerman
Assistant Examiner—Clara Yang

(57) ABSTRACT

A cross-bus switch apparatus which establishes simultaneously two or more pairs of connections between (i) a source bus arbitrarily selected from a plurality of source buses connected to one or more source apparatuses and (ii) a destination bus arbitrarily selected from a plurality of destination buses connected to one or more destination apparatuses. The cross-bus switch apparatus includes: a plurality of cross-bus switch units. The plurality of source buses are grouped into a plurality of source bus groups which are each connected to one of the plurality of cross-bus switch units. The plurality of destination buses are grouped into a plurality of destination bus groups which are each connected to one of the plurality of cross-bus switch units. Each cross-bus switch unit is connected to either (i) a source bus group or a destination bus group, or (ii) a source bus group and a destination bus group.

13 Claims, 12 Drawing Sheets

SYSTEM LSI AND A CROSS-BUS SWITCH APPARATUS ACHIEVED IN A PLURALITY OF CIRCUITS IN WHICH TWO OR MORE PAIRS OF A SOURCE APPARATUS AND A DESTINATION APPARATUS ARE CONNECTED SIMULTANEOUSLY AND BUSES ARE WIRED WITHOUT CONCENTRATION

BACKGROUND OF THE INVENTION (1) Field of the Invention

The present invention relates to a system LSI and a cross-bus apparatus in which two or more pairs of a source apparatus and a destination apparatus, respectively arbitrarily selected from a plurality of apparatuses, are connected simultaneously.

(2) Description of the Prior Art

Recently, what is called large system integration (LSI) has become commercially practical. In the system LSI integration, almost all main parts of a system which would have conventionally been achieved as a plurality of LSIs interconnected on a printed board are integrated into a system LSI.

A merit of the system LSI integration is a low cost achieved by its small size. Another merit among others is reduced delays in signal transfer. There are two types of delays in signal transfer: (1) a delay caused in operation of switching transistors; and (2) a delay caused during signal transfer through wires. Of these, the delay in switching transistors is reduced as the rule for the processing technique becomes minute and the transistor size becomes small. On the contrary, the delay in signal transfer through wires is not much reduced even if the rule for the processing technique becomes minute. This is because the ratio of the delay in signal transfer through wires to the whole signal transfer delay becomes large as the rule for the processing technique becomes minute. For example, the delay in signal transfer through wires to the whole signal transfer delay as a percentage is approximately 50% for LSIs manufactured with the 0.25 µm-rule processing technique, and 80% for LSIs manufactured with the 0.18 µm-rule processing technique. As understood from this, to reduce the whole signal transfer delay, it is indispensable to reduce the delay in signal transfer through wires. To achieve this, it is necessary to design a circuit pattern effectively without impairing the function of the circuit.

Now, the system LSI integration will be described in detail taking a digital broadcast receiver (hereinafter, referred to as DBR) as an example.

FIG. 1 shows a DBR not system-LSI-integrated.

As shown in FIG. 1, a plurality of LSIs (a microcomputer, a transport decoder, an AV decoder, Modem, Glue-ASIC, a DRAM, and a ROM) are interconnected via address buses and data buses disposed on a printed board, where each LSI is further connected to a device or the like.

FIG. 2 shows the construction of a system-LSI-integrated DBR.

As shown in FIG. 2, the system-LSI-integrated DBR includes a DBR system LSI into which almost all of the LSIs shown in FIG. 1 interconnected by buses are integrated. The system-LSI-integrated DBR also includes memories (ROM/FLASH and SDRAM) and other devices.

FIG. 3 shows the construction of the DBR system LSI. The drawing also shows external devices or the like (two "SDRAM"s, a "ROM", "Other devices") connected to the DBR system LSI via ports. Note that in the present document, components of the DBR system LSI are called units.

As shown in FIG. 3, a main memory bus 908 is connected to an SDRAM I/F unit 905, an external device I/F unit 906, and a peripheral I/O bus 907 (hereinafter, apparatuses which receive data transfer requests and are connected to a main memory bus, such as the units 905, 906, and 907 connected to the main memory. bus 908, are called "destination apparatuses"). A bus switch unit 920 is connected to: an instruction cache bus 901 connected to an instruction cache in a microcomputer unit 910; a data cache bus 902 connected to a data cache in the microcomputer unit 910; a DMA bus 903 connected to a DMA manager unit 911; a TD bus 904 connected to a transport decoder unit 912 (hereinafter, apparatuses which issue data transfer requests, such as the above units connected to the buses 901 to 904, are called "source apparatuses"); and the main memory bus 908.

FIG. 4 shows a simplified construction of the bus switch unit 920 shown in FIG. 3. The drawing also shows units connected to the bus switch unit 920.

The bus switch unit 920, as shown in FIG. 4, can select one of the instruction cache bus 901, data cache bus 902, DMA bus 903, and TD bus 904 and connect the selected bus to the main memory bus 908.

Here, suppose that two transfer requests for different source apparatuses and different destination apparatuses are issued at the same time, and further suppose that, for example, a request for a transfer from the microcomputer unit 910 to a main memory such as an SDRAM is issued and simultaneously a request for a transfer from a data cache in the microcomputer unit 910 to an I/O device is issued. When this happens, an arbitration unit 921 in the bus switch unit 920 selects one of the transfer requests and turns ON a bus switch corresponding to the selected transfer request so that a master bus and a slave bus corresponding to the selected request are connected while the other not-selected transfer request is kept waiting.

Theoretically, the two transfer requests can be executed simultaneously since the requests specify different source apparatuses and different destination apparatuses. In the above construction, however, one of the simultaneously issued requests is kept waiting. This is because buses on the destination apparatus side are shared.

One technical method for solving this problem is to use cross-bus switches.

FIG. 5 shows the construction of the DBR system LSI using the cross-bus switches. The drawing also shows external devices or the like (two "SDRAM"s, a "ROM", "Other devices") connected to the DBR system LSI via ports.

As shown in FIG. 5, a cross-bus switch unit 940 is connected to: the instruction cache bus 901 connected to the instruction cache in the microcomputer unit 910; the data cache bus 902 connected to the data cache in the microcomputer unit 910; the DMA bus 903 connected to the DMA manager unit 911; and the TD bus 904 connected to the transport decoder unit 912 (hereinafter, the buses connected to the source apparatuses are called "source buses"). Also, the cross-bus switch unit 940 is connected to: a high-speed access main memory bus 931 connected to the SDRAM I/F unit 905; a low-speed access main memory bus 932 connected to the external device I/F unit 906; and the peripheral I/O bus 907 (hereinafter, the buses connected to the destination apparatuses are called "destination buses").

FIG. 6 shows a simplified construction of the cross-bus switch unit 940 shown in FIG. 5. The drawing also shows units connected to the cross-bus switch unit 940.

The cross-bus switch unit 940, as shown in FIG. 6, can select one of the instruction cache bus 901, data cache bus 902, DMA bus 903, and TD bus 904 (hereinafter, such buses on the bus connection requesting side are called "master buses") for each of the peripheral I/O buses 907, a low-speed access main memory bus 932, and a high-speed access main memory bus 931 (hereinafter, such buses on the bus connection requested side are called "slave buses") and connect the selected master bus to a corresponding slave bus.

It should be noted here that no bus switches are disposed between the TD bus 904 and the peripheral I/O bus 907, between the TD bus 904 and the low-speed access main memory bus 932, and between the instruction cache bus 901 and the peripheral I/O bus 907. This is because there is a possibility that the transport decoder unit 912 may be connected only to the high-speed access main memory bus 931, and the instruction cache bus 901 of the microcomputer unit 910 is not connected to the peripheral I/O bus 907.

Here, suppose, as in the earlier case of the bus switch unit 920, that a transfer request 1 for transferring from the transport decoder unit 912 to the high-speed access main memory 933 such as an SDRAM is issued and simultaneously a transfer request 2 for transferring from a data cache in the microcomputer unit 910 to the low-speed access main memory 934 such as a hard disk is issued. When this happens, an arbitration unit 941 in the cross-bus switch unit 940 connects the TD bus 904 to the high-speed access main memory bus 931 by turning ON the bus switch 943 corresponding to the transfer request 1; and an arbitration unit 942 in the cross-bus switch unit 940 connects the data cache bus 902 to the low-speed access main memory bus 932 by turning ON the bus switch 944 corresponding to the transfer request 2. As a result, both transfer requests are immediately executed without waiting.

As described above, the DBR system LSI using the cross-bus switch unit differs from the bus switch unit 920 shown in FIG. 4 in that each slave bus of the destination apparatus side can independently perform arbitration. As a result, transfer requests for different source apparatuses and different destination apparatuses are executed without waiting, the transfers being executed simultaneously. Such a system offers a prospect of improvement in the system performance.

However, in such a DBR system LSI using a cross-bus switch unit, most of the buses need to be wired to the cross-bus switch unit. In case of the cross-bus switch unit 940 shown in FIG. 6, seven buses need to be wired: instruction cache bus 901, data cache bus 902, DMA bus 903, TD bus 904, peripheral I/O bus 907, low-speed access main memory bus 932, and high-speed access main memory bus 931. When the number of signal lines per bus is 64, 448 (64×7) signal lines may gather at one place. When such a large number of signal lines gather at one place, the wiring length inevitably becomes large. This decreases wiring efficiency, increases the signal transfer delay remarkably, and causes the operating frequency to level off.

SUMMARY OF THE INVENTION

It is therefore an object of the present invention to provide a cross-bus switch, a system LSI or the like which can execute data transfers between different source apparatuses and different destination apparatuses simultaneously by two or more transfer requests, and have an improved wiring efficiency without concentration of bus wiring.

The above object is fulfilled by a cross-bus switch apparatus which establishes two or more pairs of connections simultaneously between a source bus and a destination bus arbitrarily selected respectively from a plurality of source buses and a plurality of destination buses, the plurality of source buses being connected to one or more source apparatuses, and the plurality of destination buses being connected to one or more destination apparatuses, the cross-bus switch apparatus being characterized in that the cross-bus switch apparatus comprises a plurality of cross-bus switch units, and the plurality of source buses are grouped into a plurality of source bus groups which are each connected to one of the plurality of cross-bus switch units, the plurality of destination buses are grouped into a plurality of destination bus groups which are each connected to one of the plurality of cross-bus switch units, and each of the plurality of cross-bus switch units is connected to either (i) one of the plurality of source bus groups or one of the plurality of destination bus groups, or (ii) one of the plurality of source bus groups and one of the plurality of destination bus groups.

With the above construction, the source buses and the destination buses are each divided into a plurality of groups which are each connected to a plurality of cross-bus switch units. This construction does not generate a concentration of buses and therefore improves the wiring efficiency.

The above cross-bus switch apparatus may further comprise: one or more connection buses which are each connected to two or more of the plurality of cross-bus switch units.

With the above construction, the cross-bus switch apparatus of the present invention is divided using connection buses without impairing the functions.

In the above cross-bus switch apparatus, at least one cross-bus switch unit connected to a certain connection bus may be operable to connect a source bus to the certain connection bus, and at least one cross-bus switch unit connected to the certain connection bus is operable to connect a destination bus to the certain connection bus.

With the above construction, the cross-bus switch apparatus of the present invention is divided using connection buses and cross-bus switch units connected to the connection buses, without impairing the functions.

In the above cross-bus switch apparatus, when two or more buses among source buses and connection buses connected to one of the plurality of cross-bus switch units send requests to the cross-bus switch unit for a connection to one of a destination bus and a different connection bus which are connected to the cross-bus switch unit, the cross-bus switch unit may select one out of the two or more buses and connect the selected bus to the requested bus.

With the above construction, one among a plurality of connection requests issued to the same bus can be selected.

The above object is also fulfilled by a cross-bus switch apparatus operable to connect master buses on a bus connection requesting side to slave buses on a bus connection requested side, the cross-bus switch apparatus comprising: a plurality of cross-bus switch units; and one or more connection buses which are each operable to interconnect two or more of the plurality of cross-bus switch units, are each connected as a master bus to one or more of the plurality of cross-bus switch units, and are each connected as a slave bus to another one or more of the plurality of cross-bus switch units.

With the above construction, the cross-bus switch apparatus of the present invention is divided into a plurality of cross-bus switch units, without impairing the functions.

The above cross-bus switch apparatus may further comprise: a plurality of source buses; and a plurality of destination buses, wherein each of the plurality of source buses is connected to one or more source apparatuses on a data transfer requesting side, and is connected to one of the plurality of cross-bus switch units, each of the plurality of destination buses is connected to one or more destination apparatuses on a data transfer requested side, and is connected to one of the plurality of cross-bus switch units, one of (i) a set of two or more of the plurality of source buses, (ii) a set of connection buses, and (iii) a set of one or more of the plurality of source buses and one or more connection buses are connected as master buses to each of the plurality of cross-bus switch units, one of (iv) a set of one or more of the plurality of destination buses, (v) a set of one or more connection buses, and (vi) a set of one or more of the plurality of destination buses and one or more connection buses are connected as slave buses to each of the plurality of cross-bus switch units, and each of the plurality of cross-bus switch units is operable to connect a certain source bus among a set of source buses connected to the cross-bus switch unit to a certain destination bus among a set of destination buses connected to the cross-bus switch unit.

With the above construction, the bus wiring does not concentrate at one place since a plurality of source buses and a plurality of destination buses are respectively divided into groups and the groups are connected to a plurality of cross-bus switch units. This improves the wiring efficiency.

In the above cross-bus switch apparatus, each of the plurality of cross-bus switch units may include for each slave bus connected to the cross-bus switch unit: arbitration means for, when two or more master buses connected to the cross-bus switch unit send requests to the cross-bus switch unit for a connection to a slave bus corresponding to the arbitration means, selecting one out of the two or more master buses and connecting the selected master bus to the requested slave bus.

With the above construction, when a plurality of master buses issue connection requests to a same slave bus, one master bus is selected from the plurality of master buses.

In the above cross-bus switch apparatus, the plurality of cross-bus switch units may include a first-layer cross-bus switch unit and N second-layer cross-bus switch units, wherein N is an integer equal to or larger than 1, the first-layer cross-bus switch unit is connected to a set of source buses as a set of master buses, and is connected to a set of one or more destination buses and N connection buses as a set of slave buses, and each of the N second-layer cross-bus switch units is connected to a set of one or more source buses and a connection bus as a set of master buses, and is connected to a set of one or more destination buses as a set of slave buses.

With the above construction, the bus wiring does not concentrate at one place since the cross-bus switch apparatus includes one first-layer cross-bus switch unit and N second-layer cross-bus switch units. This improves the wiring efficiency.

In the above cross-bus switch apparatus, each arbitration means may select master buses on a substantially even basis.

With the above construction, if a plurality of master buses issue connection requests to a same slave bus, a case where one among the plurality of master buses is selected in succession does not occur.

In the above cross-bus switch apparatus, each arbitration means may include: storage means for storing identification information of a most recently connected master bus; selection means for, when two or more master buses connected to the selection means send requests to the selection means for a connection to a slave bus corresponding to the selection means, selecting a master bus excluding master buses which are identified by identification information stored in the storage means; connection means for connecting the master bus selected by the selection means to the requested slave bus; and rewriting means for storing identification information of the master bus connected by the connection means into the storage means.

With the above construction, the arbitration means has a relatively simple construction.

In the above cross-bus switch apparatus, a source bus expected to have a high exclusive use rate may be connected to one of the N second-layer cross-bus switch units.

With the above construction, it is possible in spite of the relatively simple construction of the arbitration means to allow the source buses connected to the N second-layer cross-bus switch units to have higher exclusive use rates than the source buses connected to the first-layer cross-bus switch unit. Such a wiring is suitable for cross-bus switch apparatuses.

This indicates that it is possible to change the exclusive use rate of each source bus by adopting this construction of the cross-bus switch units although the arbitration means has such a relatively simple construction as selects the master buses on a substantially even basis.

In the above cross-bus switch apparatus, the source bus expected to have a high exclusive use rate and connected to one of the N second-layer cross-bus switch units may be used for transferring stream data.

The above wiring is suitable for cross-bus switch apparatuses since in apparatuses such as DBRs which deal with stream data, a certain amount of stream data needs to be secured lest the reproduction of video images or the like is interrupted, and therefore, the exclusive use rate of a bus, such as the TD bus, which is used to transfer stream data needs to be increased.

For example, while in conventional DBRs, the exclusive use rate of the TD bus has been increased by using such a relatively complicated arbitration unit as selects master buses at different rates, in the DBR using the cross-bus switch apparatus with the above construction, it is possible to increase the exclusive use rate of the TD bus although the arbitration means has such a relatively simple construction as selects the master buses on a substantially even basis.

In the above cross-bus switch apparatus, at least one of the N second-layer cross-bus switch units may include: a plurality of internal slave buses respectively corresponding to a plurality of banks in a memory; a memory-dedicated destination bus connected to the memory; and a memory interface for connecting the memory-dedicated destination bus to one of the plurality of internal slave buses corresponding to a currently active bank, and switching from the internal slave bus to another internal slave bus when a bank corresponding to the other internal slave bus becomes active, wherein each of the arbitration means included in the at least one of the N second-layer cross-bus switch units corresponds to an internal slave bus and refers to bank addresses on master buses and selects, as targets of connection to slave buses, master buses whose bank addresses match a bank address of a bank corresponding to the internal slave bus for the arbitration means.

With the above construction, in which at least one of the N second-layer cross-bus switch units includes internal slave buses which respectively correspond to a plurality of banks in a memory such as an SDRAM, it is possible to access the memory efficiently.

In the above cross-bus switch apparatus, the at least one second-layer cross-bus switch unit including the memory interface may further include: active bank transfer means for transmitting information on connection state of buses in the at least one second-layer cross-bus switch unit to arbitration means of the first-layer cross-bus switch unit that corresponds to the at least one second-layer cross-bus switch unit, wherein the arbitration means of the first-layer cross-bus switch unit that corresponds to the at least one second-layer cross-bus switch unit, when a plurality of master buses connected to a connection bus corresponding to the arbitration unit issue a connection request for the connection bus, selects, based on a connection state of bus switches in the N second-layer cross-bus switch units transmitted from the active bank transfer means that corresponds to the at least one second-layer cross-bus switch unit, one among the plurality of master buses and connects the connection bus to the selected master bus.

With the above construction in which the active bank transfer means transmits information on connection state of buses in the at least one second-layer cross-bus switch unit to arbitration means of the first-layer cross-bus switch unit, the first-layer cross-bus switch unit can recognize free banks to which they are connected. This enables the banks to be selected more efficiently.

In the above cross-bus switch apparatus, the plurality of cross-bus switch units may be a plurality of first-layer cross-bus switch units and one or more second-layer cross-bus switch units, each of the plurality of first-layer cross-bus switch units is connected to a set of one or more source buses as a set of master buses, and is connected to a set of one or more connection buses as a set of slave buses, and each of the one or more second-layer cross-bus switch units is connected to a different connection bus connected, as a slave bus, to each of the plurality of first-layer cross-bus switch units, and is connected to a destination bus as a slave bus.

With the above construction, the bus wiring does not concentrate at one place since the cross-bus switch apparatus includes one first-layer cross-bus switch unit and one or more second-layer cross-bus switch units. This improves the wiring efficiency.

In the above cross-bus switch apparatus, each of the plurality of first-layer cross-bus switch units may be connected to one of source bus groups which are generated by dividing the plurality of source buses on a substantially even basis.

With the above construction in which each first-layer cross-bus switch unit is connected to a source bus group generated by dividing the plurality of source buses on a substantially even basis, the first-layer cross-bus switch units have substantially a equal size. This enables the circuits to be divided efficiently.

In the above cross-bus switch apparatus, the plurality of cross-bus switch units may be: a plurality of first-layer cross-bus switch units; a plurality of second-layer cross-bus switch units; . . . a plurality of (M−1)-layer cross-bus switch units; and one or more M-layer cross-bus switch units, wherein M is an integer equal to or larger than 3, each of the plurality of first-layer cross-bus switch units is connected to a set of one or more source buses as a set of master buses, and is connected to a set of one or more connection buses as a set of slave buses, each of the plurality of second- to (M−1)-layer cross-bus switch units is connected to a set of connection buses which are-respectively connected, as slave buses, to a plurality of cross-bus switch units of a layer smaller than a current layer by one as a set of master buses, and is connected to a set of one or more connection buses as a set of slave buses, and each of the one or more M-layer cross-bus switch units is connected to a set of connection buses which are respectively connected, as slave buses, to a plurality of (M−1)-layer cross-bus switch units as a set of master buses, and is connected to a destination bus as a set of slave buses.

With the above construction in which the plurality of cross-bus switch units includes: a plurality of first-layer cross-bus switch units; a plurality of second-layer cross-bus switch units; . . . a plurality of (M−1)-layer cross-bus switch units; and one or more M-layer cross-bus switch units, the bus wiring does not concentrate at one place. This improves the wiring efficiency.

In the above cross-bus switch apparatus, each of the plurality of first-layer cross-bus switch units may be connected to one of source bus groups which are generated by dividing the plurality of source buses on a substantially even basis.

With the above construction in which each first-layer cross-bus switch unit is connected to a source bus group generated by dividing the plurality of source buses on a substantially even basis, the first-layer cross-bus switch units have substantially a equal size. This enables the circuits to be divided efficiently.

The above object is also fulfilled by a system LSI including a cross-bus switch apparatus which establishes two or more pairs of connections simultaneously between a source bus and a destination bus arbitrarily selected respectively from a plurality of source buses and a plurality of destination buses, the plurality of source buses being connected to one or more source apparatuses, and the plurality of destination buses being connected to one or more destination apparatuses, the system LSI being characterized in that the cross-bus switch apparatus comprises a plurality of cross-bus switch units, and the plurality of source buses are grouped into a plurality of source bus groups which are each connected to one of the plurality of cross-bus switch units, the plurality of destination buses are grouped into a plurality of destination bus groups which are each connected to one of the plurality of cross-bus switch units, each of the plurality of cross-bus switch units is connected to either (i) one of the plurality of source bus groups or one of the plurality of destination bus groups, or (ii) one of the plurality of source bus groups and one of the plurality of destination bus groups, and each of the plurality of cross-bus switch units is operable to connect a certain source bus among a source bus group connected to the cross-bus switch unit to a certain destination bus among a destination bus group connected to the cross-bus switch unit.

With the above construction, the source buses and the destination buses are each divided into a plurality of groups which are each connected to a plurality of cross-bus switch units. This construction does not generate a concentration of buses and therefore improves the wiring efficiency, The above object is also fulfilled by a system LSI including a cross-bus switch apparatus operable to connect master buses on a bus connection requesting side to slave buses on a bus connection requested side, the cross-bus switch apparatus comprising: a plurality of cross-bus switch units; and one or more connection buses which are each operable to interconnect two or more of the plurality of cross-bus switch units, are each connected as a master bus to one or more of the plurality of cross-bus switch units, and are each connected as a slave bus to another one or more of the plurality of cross-bus switch units.

With the above construction, the cross-bus switch apparatus of the present invention is divided into a plurality of cross-bus switch units, without impairing the functions.

The above object is also fulfilled by a digital broadcast receiver which includes a cross-bus switch apparatus operable to connect master buses on a bus connection requesting side to slave buses on a bus connection requested side, the cross-bus switch apparatus comprising: a first-layer cross-bus switch unit; N second-layer cross-bus switch units; N connection buses; a plurality of source buses; and a plurality of destination buses, wherein N is an integer equal to or larger than 1, the N connection buses are each operable to interconnect the first-layer cross-bus switch unit and one of the N second-layer cross-bus switch units, are each connected as a master bus to the N second-layer cross-bus switch units, and are each connected as a slave bus to the first-layer cross-bus switch unit, each of the plurality of source buses is connected to one or more source apparatuses on a data transfer requesting side, and is connected to one of the first-layer cross-bus switch unit and the N second-layer cross-bus switch units, each of the plurality of destination buses is connected to one or more destination apparatuses on a data transfer requested side, and is connected to one of the first-layer cross-bus switch unit and the N second-layer cross-bus switch units, the first-layer cross-bus switch unit is connected to a plurality of source buses as master buses, and is connected to one or more destination buses and N connection buses as slave buses, and is operable to connect a certain master bus among master buses connected to the first-layer cross-bus switch unit to a certain slave bus among slave buses connected to the first-layer cross-bus switch unit, and when a plurality of master buses connected to the first-layer cross-bus switch unit send requests to the first-layer cross-bus switch unit for a connection to a slave bus corresponding to the first-layer cross-bus switch unit, selects one master bus among the plurality of connected master buses and connects the selected master bus to the requested slave bus, wherein the first-layer cross-bus switch unit selects the plurality of connected master buses on a substantially even basis, each of the N second-layer cross-bus switch units is connected to one or more source buses and one connection bus as master buses, and is connected to one or more destination buses as slave buses, and is operable to connect a certain master bus among master buses connected to the second-layer cross-bus switch unit to a certain slave bus among slave buses connected to the second-layer cross-bus switch unit, and when a plurality of master buses connected to the second-layer cross-bus switch unit send requests to the second-layer cross-bus switch unit for a connection to a slave bus corresponding to the second-layer cross-bus switch unit, selects one master bus among the plurality of connected master buses and connects the selected master bus to the requested slave bus, wherein each N second-layer cross-bus switch unit selects the plurality of connected master buses on a substantially even basis, and a source bus with a high priority rank used for transferring stream data is connected to one of the N second-layer cross-bus switch units.

With the above construction, the bus wiring does not concentrate at one place since the cross-bus switch apparatus includes one first-layer cross-bus switch unit and N second-layer cross-bus switch units. This improves the wiring efficiency.

Also, when a plurality of master buses issue connection requests to a same slave bus, it does not happen that one among the plurality of master buses is selected in succession.

Also, it is possible, in spite of the relatively simple construction of the arbitration means, to allow the source buses connected to the N second-layer cross-bus switch units to have higher exclusive use rates than the source buses connected to the first-layer cross-bus switch unit.

Also, the above wiring is suitable for cross-bus switch apparatuses since in apparatuses such as DBRs which deal with stream data, a certain amount of stream data needs to be secured lest the reproduction of video images or the like is interrupted, and therefore, the exclusive use rate of a bus, such as the TD bus, which is used to transfer stream data needs to be increased.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
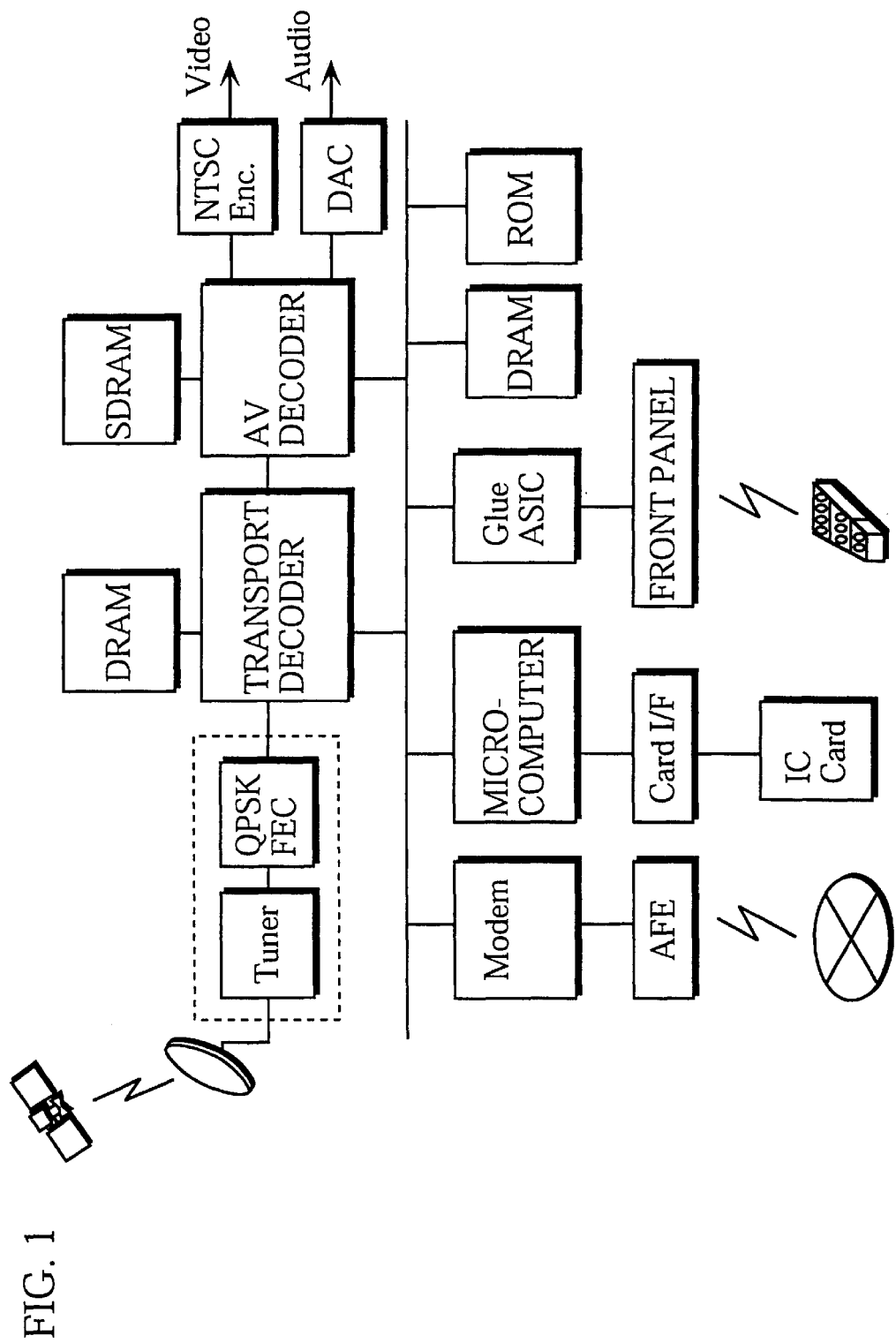
FIG. 1 shows the construction of a DBR not system-LSI-integrated.
Figure 2:
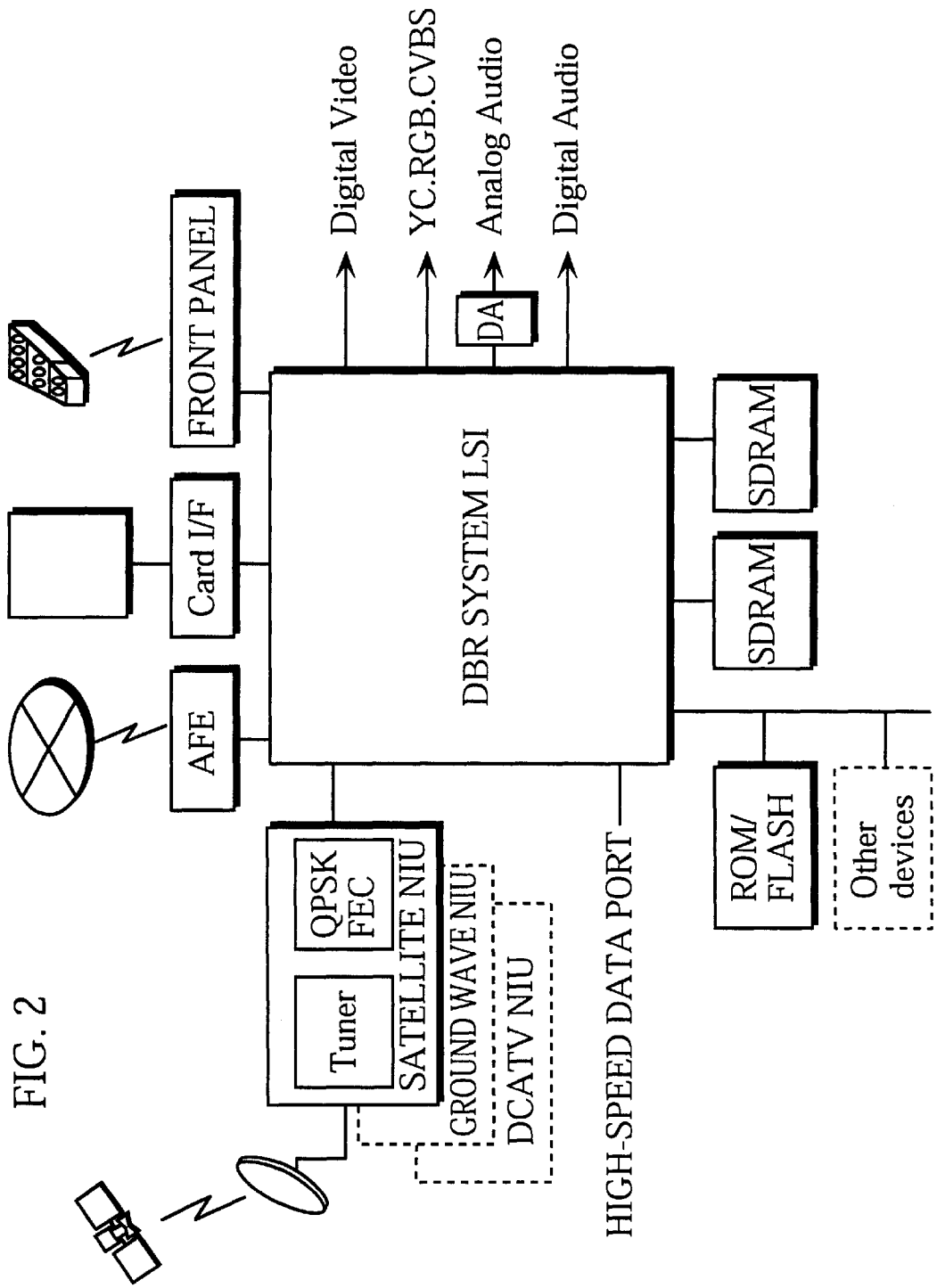
FIG. 2 shows the construction of a system-LSI-integrated DBR.
Figure 3:
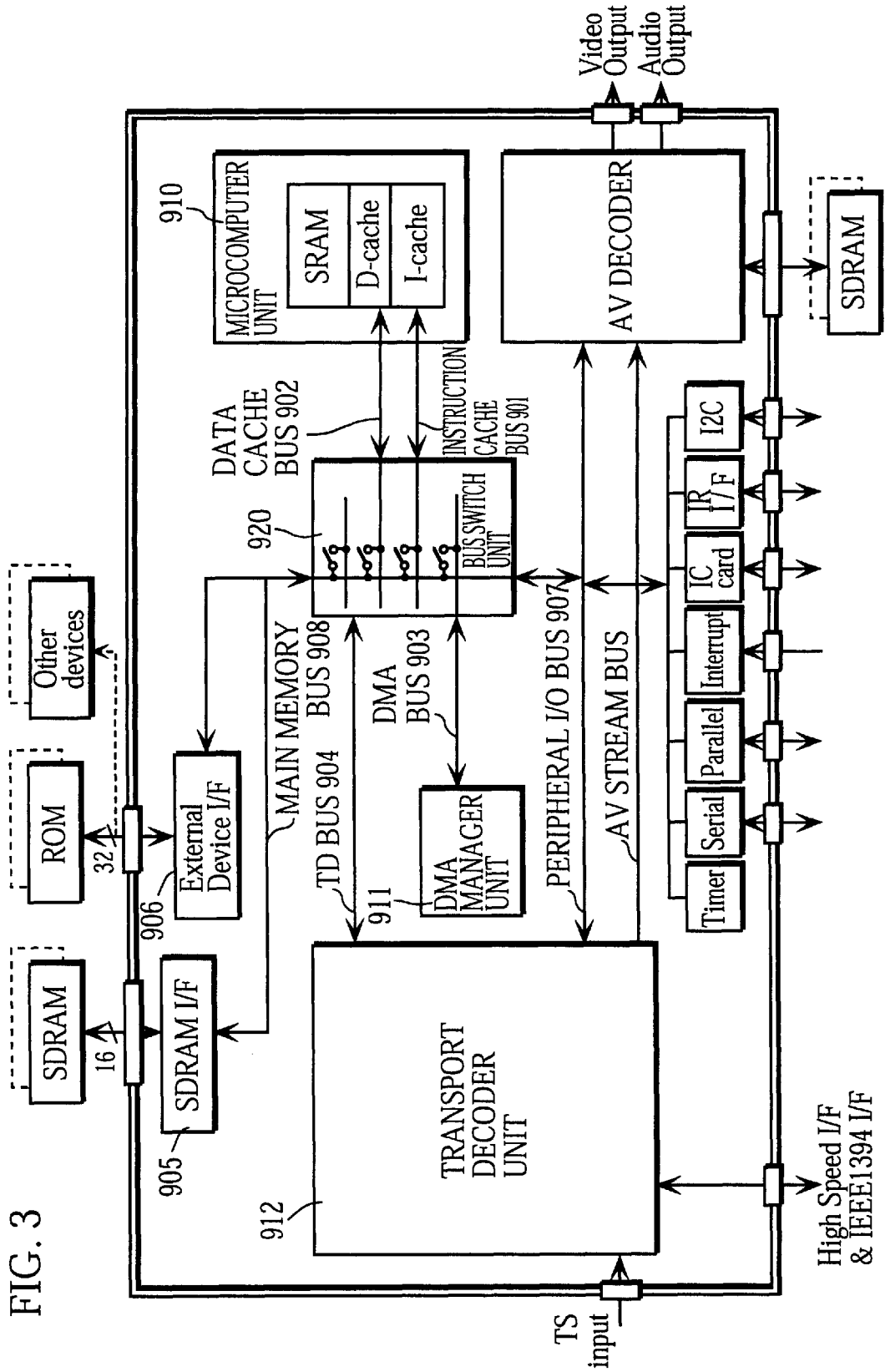
FIG. 3 shows the construction of the DBR system LSI.
Figure 4:
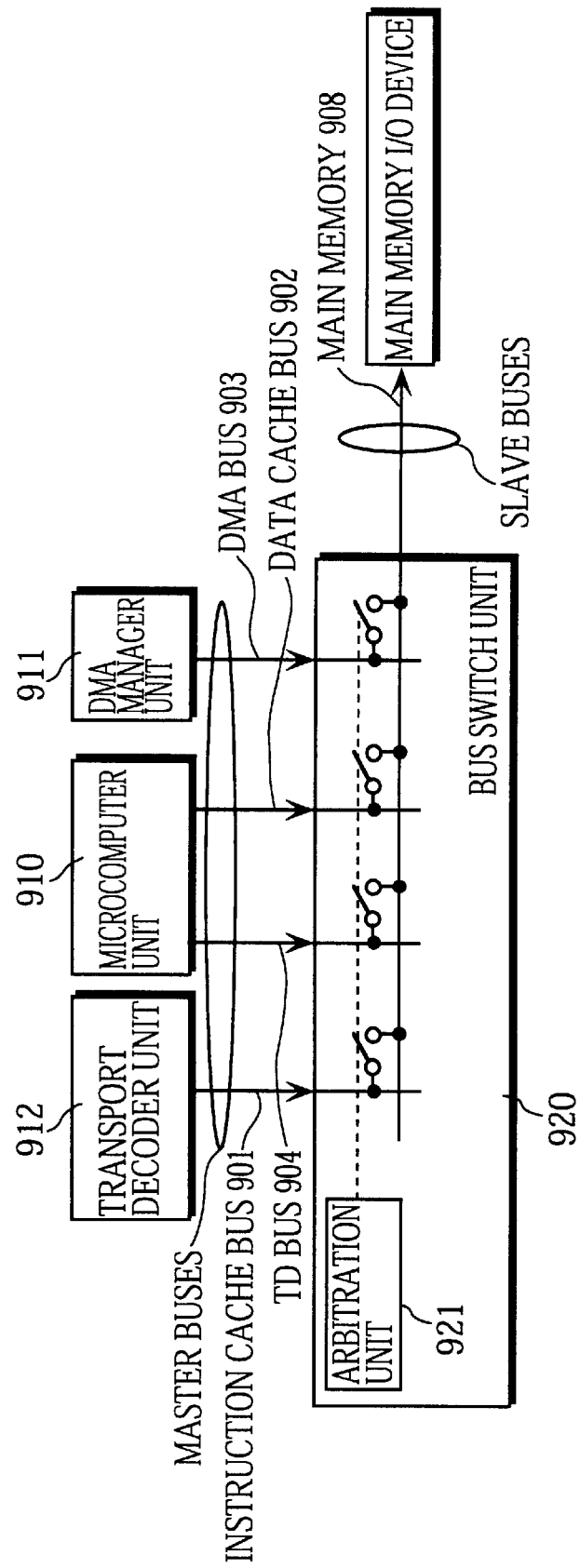
FIG. 4 shows a simplified construction of the bus switch unit shown in FIG. 3.
Figure 5:
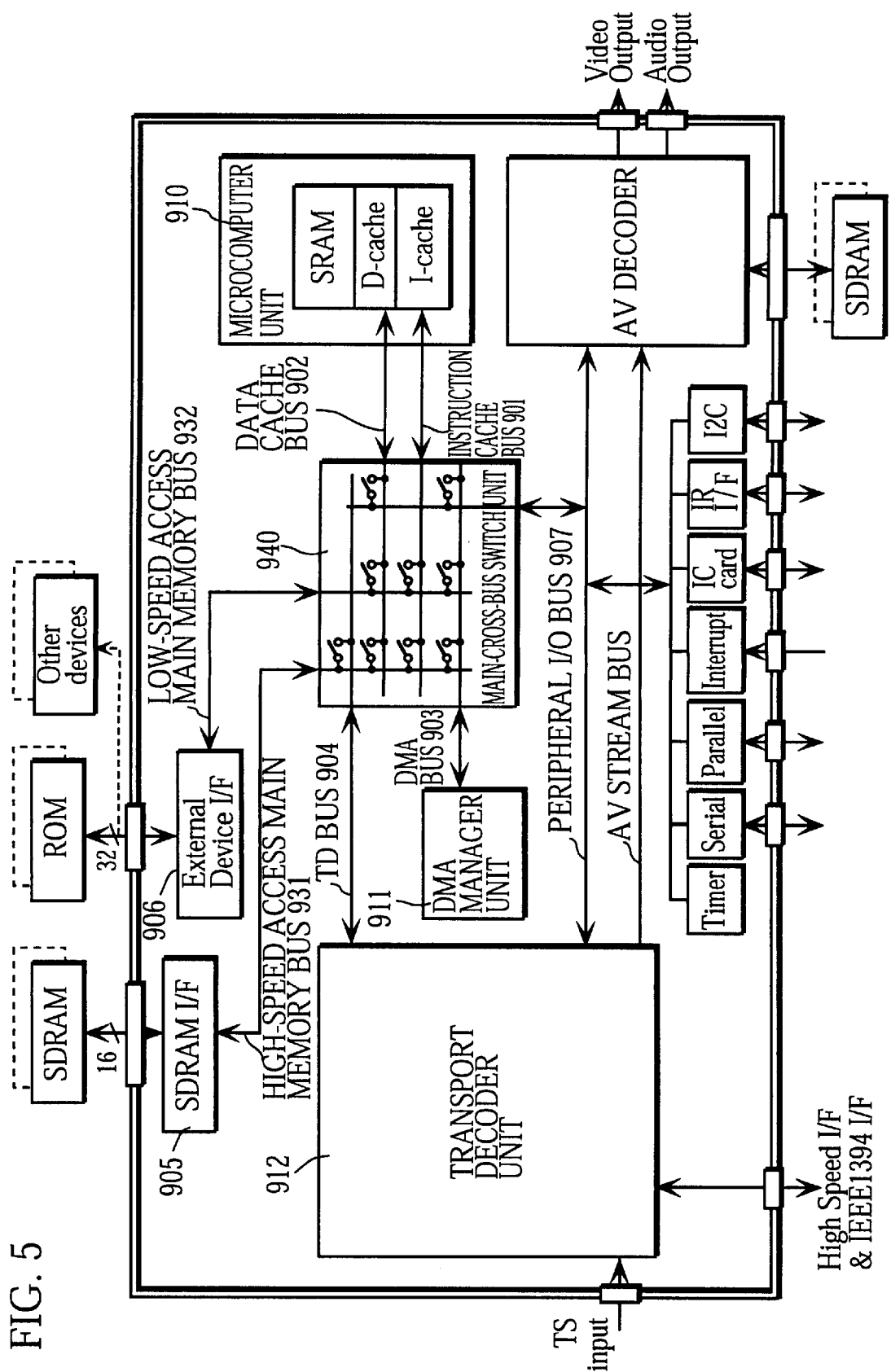
FIG. 5 shows the construction of the DBR system LSI using the cross-bus switches.
Figure 6:
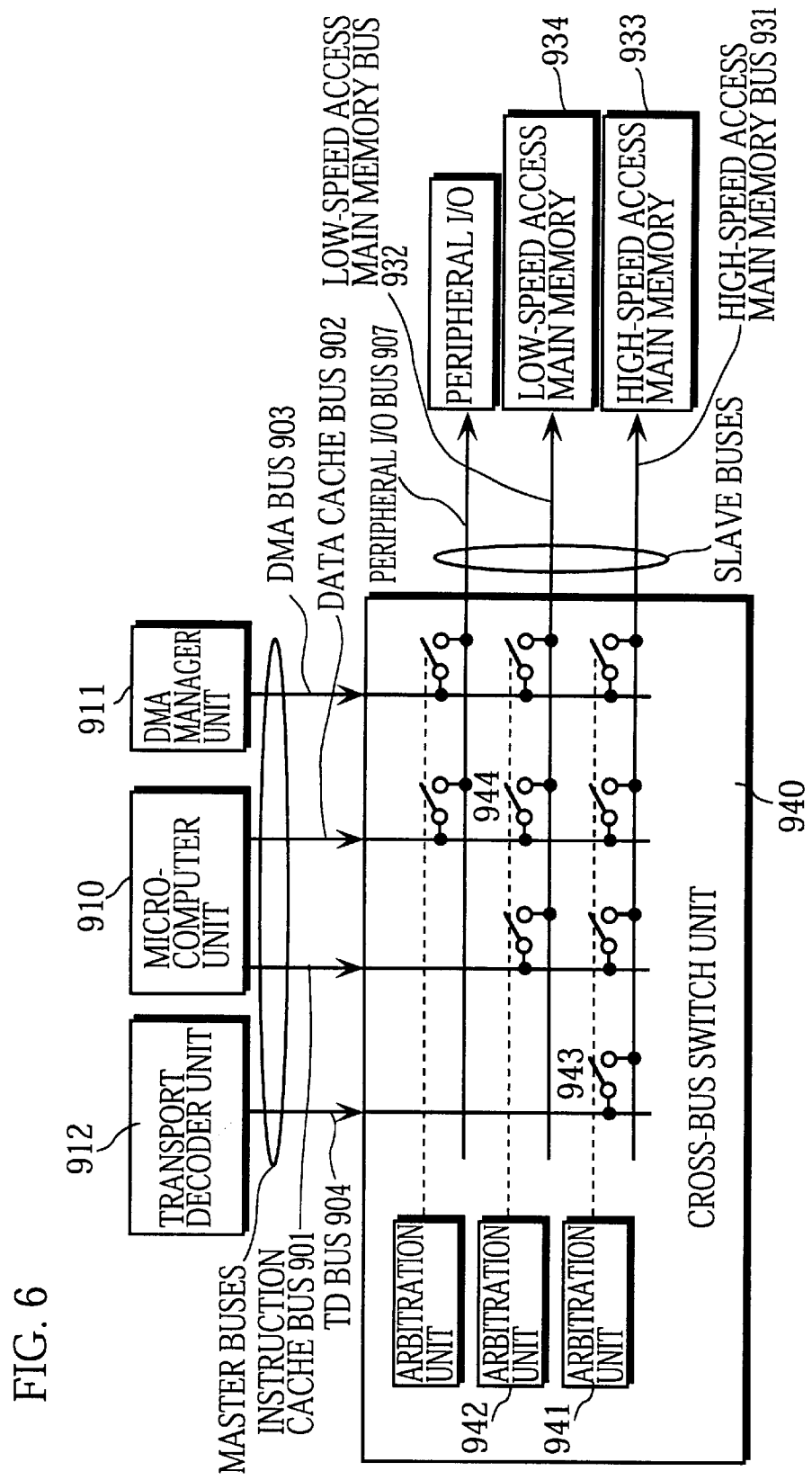
FIG. 6 shows a simplified construction of the cross-bus switch unit shown in FIG. 5.

The following are a description of the present invention through specific embodiments thereof by way of referring to the drawings.

Embodiment 1

The cross-bus switch apparatus in Embodiment 1 of the present invention is characterized in that it has two circuits separated from a conventional circuit while the cross-bus switch apparatus has the same function as conventional techniques. More specifically, the TD bus and the other buses connected to the master bus side in the main-cross-bus switch unit are separated into different circuits; buses other than the TD bus are connected as master buses to the sub-cross-bus switch unit; and these cross-bus switch units are connected via a connection bus. The cross-bus switch apparatus of the present embodiment is expected to have excellent wiring efficiency and increased operating frequency.

<Construction>

Figure 7:
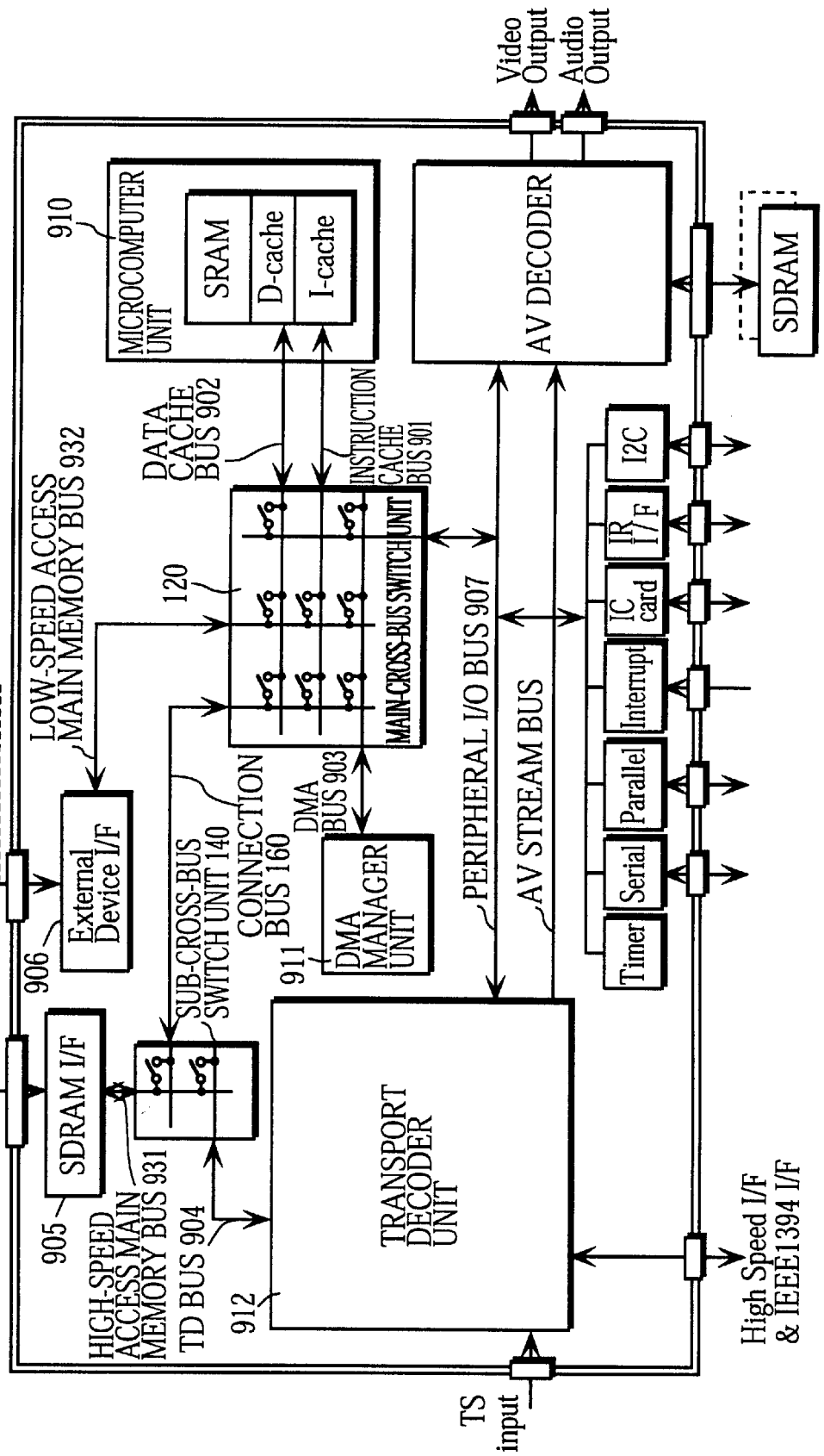
FIG. 7 shows the construction of the DBR system LSI using the cross-bus switch apparatus in Embodiment 1 of the present invention.

FIG. 7 shows the construction of the DBR system LSI using the cross-bus switch apparatus in Embodiment 1 of the present invention. The drawing also shows external devices or the like (two "SDRAM"s, a "ROM", "Other devices") connected to the DBR system LSI via ports.

The cross-bus switch unit in Embodiment 1 of the present invention includes a main-cross-bus switch unit 120, a sub-cross-bus switch unit 140, and a connection bus 160.

As shown in FIG. 7, the main-cross-bus switch unit 120 is connected to three source buses as master buses: an instruction cache bus 901 connected to an instruction cache in a microcomputer unit 910; a data cache bus 902 connected to the data cache in the microcomputer unit 910; and a DMA bus 903 connected to a DMA manager unit 911. The main-cross-bus switch unit 120 is also connected to slave buses that are the connection bus 160 and two destination buses: a low-speed access main memory bus 932 connected to the external device I/F unit 906; and a peripheral I/O bus 907.

The sub-cross-bus switch unit 140 is connected to master buses: a source bus connected to the transport decoder unit 912; and the connection bus 160. The sub-cross-bus switch unit 140 is also connected to a slave bus that is, the high-speed access main memory bus 931 (a destination bus) connected to the SDRAM I/F unit 905.

Figure 8:
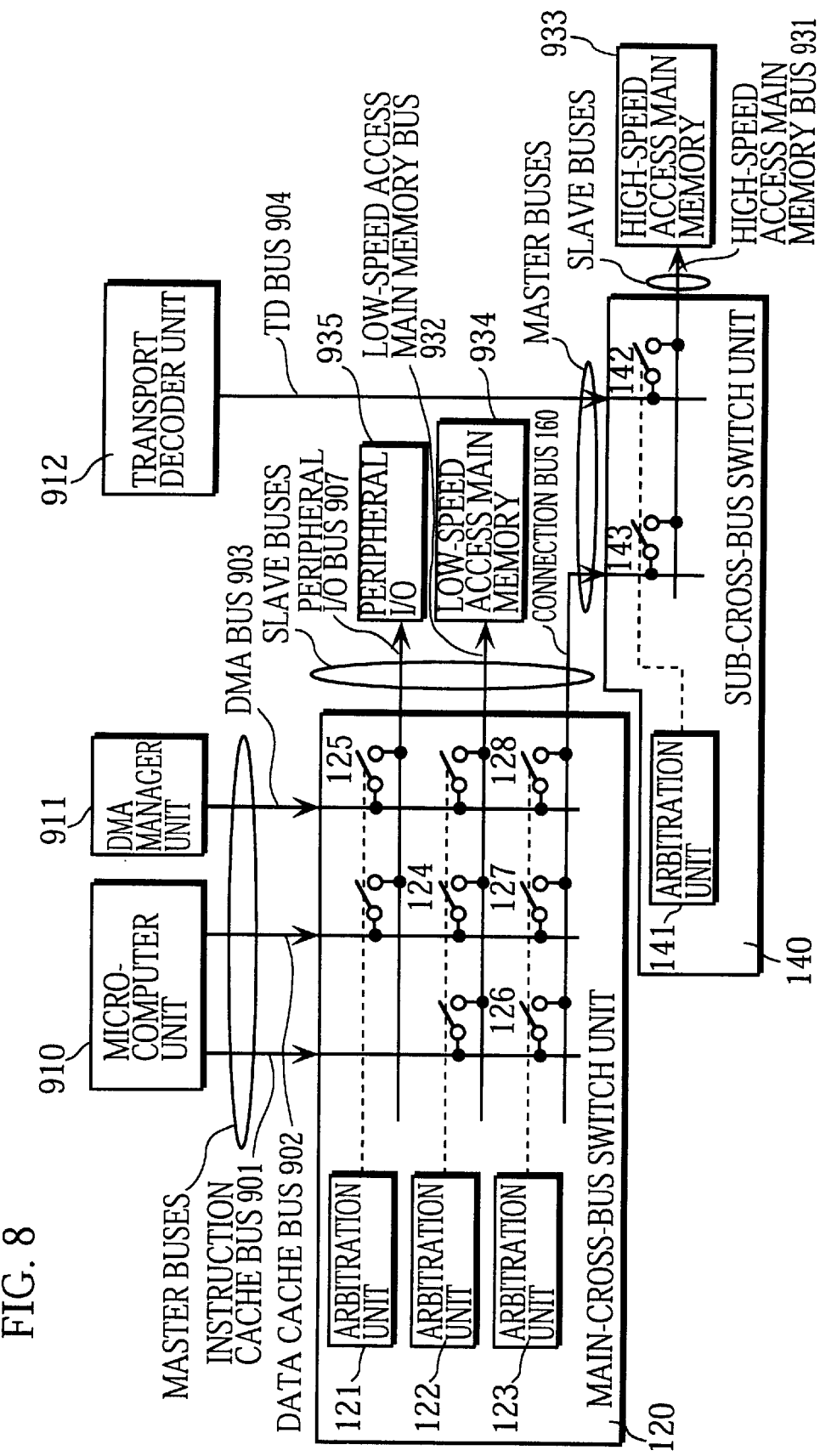
FIG. 8 shows a simplified construction of the cross-bus switch apparatus shown in FIG. 7.

FIG. 8 shows a simplified construction of the cross-bus switch apparatus shown in FIG. 7. The drawing also shows units connected to the cross-bus switch apparatus.

As shown in FIG. 8, the main-cross-bus switch unit 120 is connected to a set of master buses: the instruction cache bus 901, the data cache bus 902, and the DMA bus 903, and is connected to a set of slave buses: the peripheral I/O bus 907, the low-speed access main memory bus 932, and the connection bus 160. A bus switch is disposed at each possible combination of one master bus and one slave bus. With this construction, it is possible to select one master bus for each slave bus and connect each selected master bus to a corresponding slave bus. The main-cross-bus switch unit 120 also includes arbitration units 121 to 123 which, when two or more master buses, among a plurality of master buses connectable to a certain slave bus, simultaneously issue requests for a connection to the certain slave bus, selects one bus switch connected to the certain slave bus and allows the selected bus switch to connect one of the two or more master buses to the certain slave bus.

As shown in FIG. 8, the sub-cross-bus switch unit 140 is connected to the high-speed access main memory bus 931 as a slave bus and also connected to a set of master buses: the TD bus 904; and the connection bus 160. The sub-cross-bus switch unit 140 includes a plurality of bus switches corresponding to all possible combinations of a master bus and a slave bus so that each bus switch can connect a master bus to a slave bus. With this construction, it is possible to select one master bus for each slave bus and connect the selected master bus to each corresponding slave bus. The sub-cross-bus switch unit 140 also includes an arbitration unit 141 which, when two or more master buses, among a plurality of master buses connectable to a certain slave bus, simultaneously issue requests for a connection to the certain slave bus, selects one bus switch connected to the certain slave bus and allows the selected bus switch to connect one of the two or more master buses to the certain slave bus.

It should be noted here, as in the earlier example, that no bus switches are disposed between the TD bus 904 and the peripheral I/O bus 907, between the TD bus 904 and the low-speed access main memory bus 932, and between the instruction cache bus 901 and the peripheral I/O bus 907. This is because there is a possibility that the transport decoder unit 912 may be connected only to the high-speed access main memory bus 931, and the instruction cache bus of the microcomputer unit 910 is not connected to the peripheral I/O bus 907.

Each arbitration unit included, for each slave bus, in the main-cross-bus switch unit 120 and the sub-cross-bus switch unit 140 selects bus switches with a dedicated method such as the round robin scheduling. The following is a description of the arbitration units centering on the arbitration unit 123 which is included in the main-cross-bus switch unit 120 and operable to connect the connection unit 160.

Figure 9:
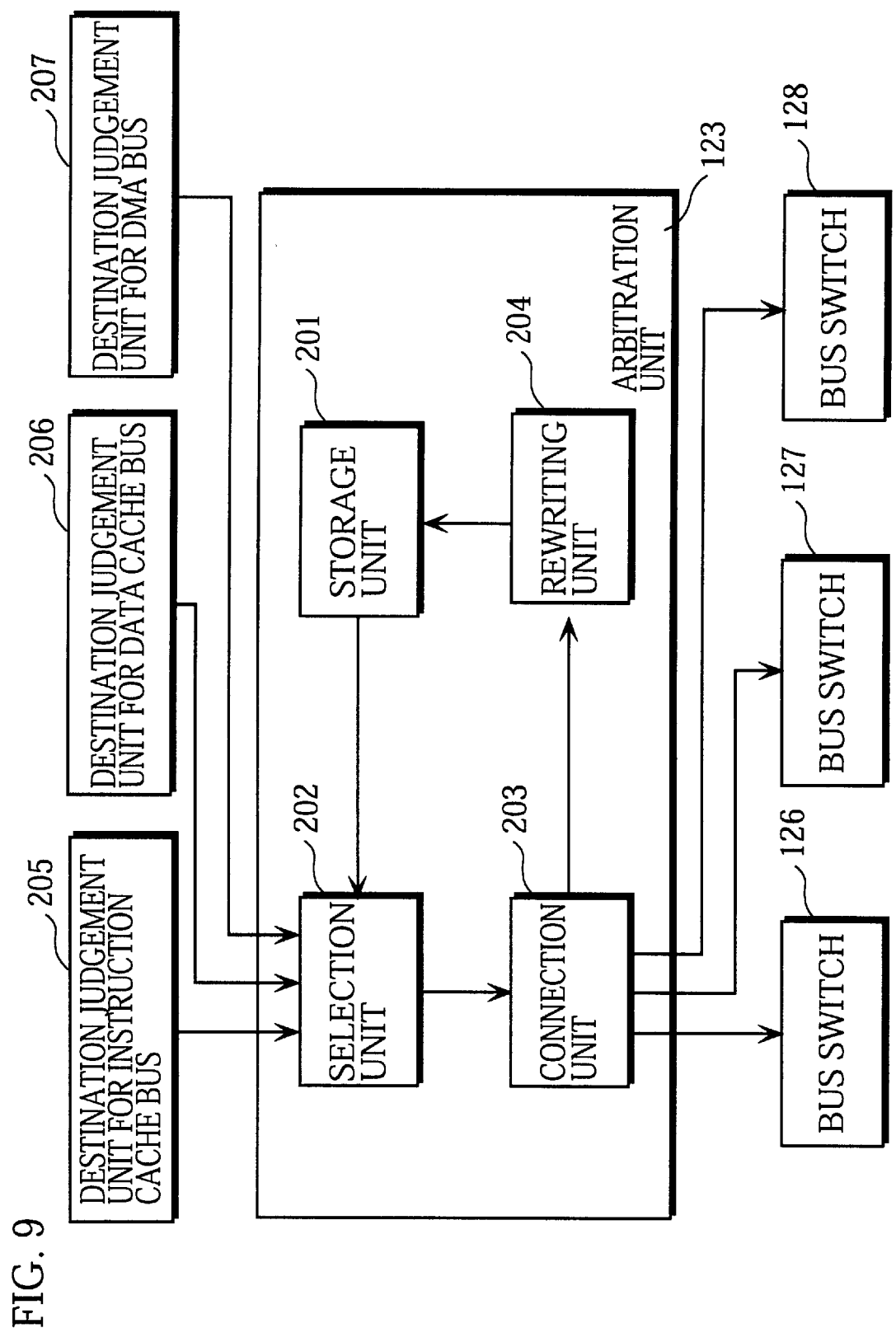
FIG. 9 shows the construction of the arbitration unit which is included in the main-cross-bus switch unit and the sub-cross-bus switch unit for each slave bus.

FIG. 9 shows the construction of the arbitration unit 123 which is included in the main-cross-bus switch unit 120 and operable to connect the connection unit 160.

The arbitration unit 123 shown in FIG. 9 includes a storage unit 201, a selection unit 202, a connection unit 203, and a rewriting unit 204. FIG. 9 also shows three destination judgment units provided for each master bus: a destination judgment unit 205 for the instruction cache bus 901, a destination judgment unit 206 for the data cache bus 906, and a destination judgment unit 207 for the DMA bus 903, though these destination judgment units are not shown in FIG. 8.

The storage unit 201, achieved as, for example, a memory device, stores identification information of a master bus connected immediately before.

The selection unit 202, when a destination judgment unit corresponding to a master bus connectable to a certain slave bus issues a request for a connection to the certain slave bus, selects one bus switch connected to the master bus. Also, when a plurality of destination judgment units corresponding to master buses connectable to a certain slave bus issue simultaneously requests for a connection to the certain slave bus, the selection unit 202 selects one bus switch connected to a master bus which is not identified by the identification information stored in the storage unit 201.

The connection unit 203 connects the requested master bus to the corresponding slave bus using the bus switch selected by the selection unit 202.

The rewriting unit 204 stores identification information of the master bus connected by the connection unit 203 into the storage unit 201.

Each of the destination judgment units 205 to 207, on receiving a transfer request, judges which slave bus is the destination of the transfer request, and notifies an arbitration unit corresponding to the destination slave bus of the transfer request, so that each arbitration unit can recognize that a transfer request has been issued.

Note that when three or more master buses are connectable to a slave bus, the priority level of each of the master buses may be determined beforehand in accordance with the order of the master buses whose identification information is stored in the storage unit 201. For example, when there are N master buses, where N≧3, the priority levels are as follows beginning with the highest: {2, 3, . . . N, 1} when an identification number of a master bus stored in the storage unit 201 is 1; {3, 4, . . . N, 1, 2} when the identification number is 2; {M+1, . . . N, 1, 2, . . . M} when the identification number is M (2≦M≦N−1); and {1, 2, . . . N} when the identification number is N.

Each connection bus interconnects two or more cross-bus switch units, is a master bus corresponding to one or more cross-bus switch units, and is a slave bus corresponding to one or more cross-bus switch units. In the present example, the connection bus 160 is a master bus for the sub-cross-bus switch unit 140 and is a slave bus for the main-cross-bus switch unit 120.

<Operation>

Figure 10:
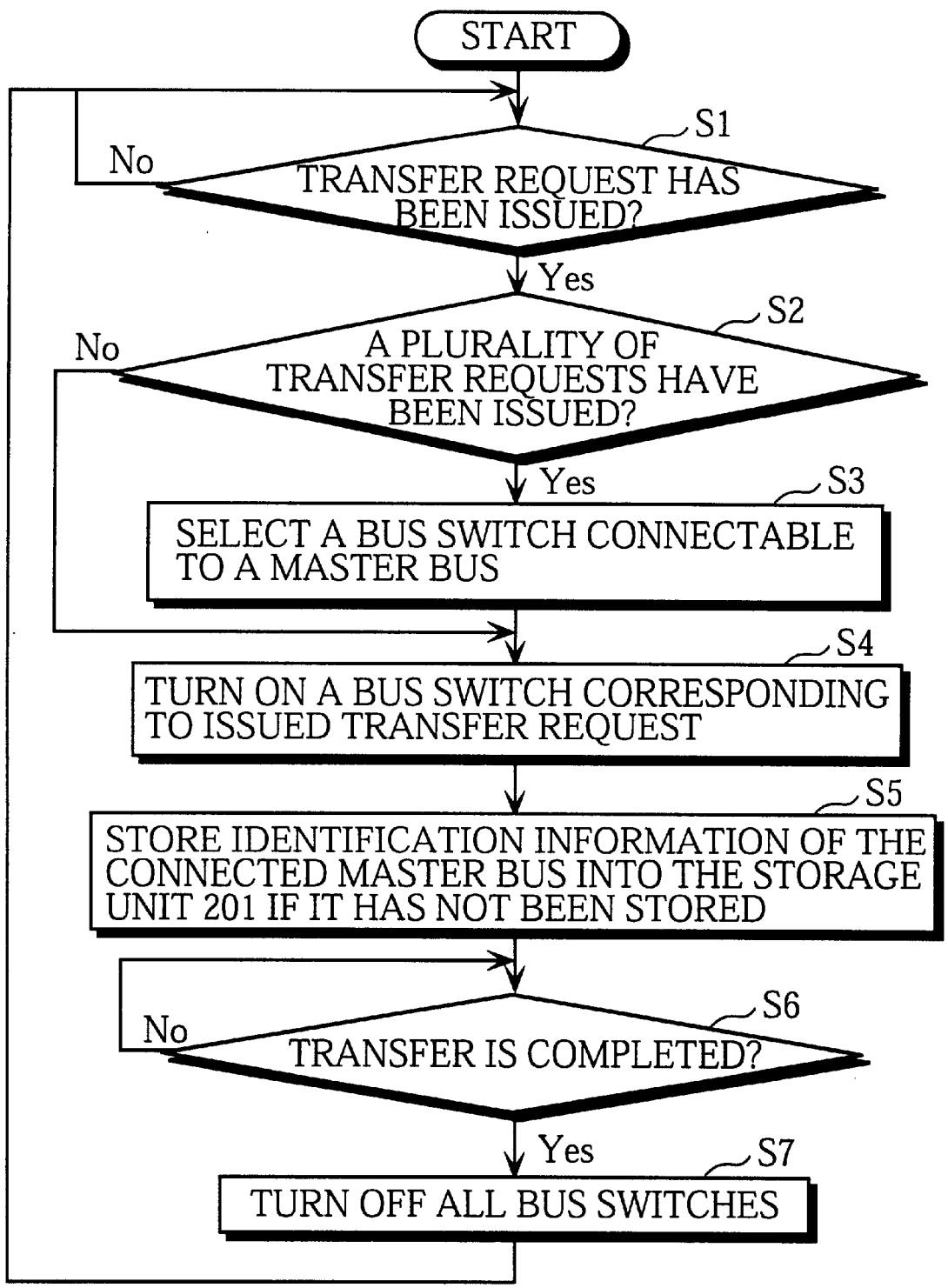
FIG. 10 shows the procedure of the arbitration executed by each arbitration unit of the cross-bus switch apparatus in Embodiment 1 of the present invention.

FIG. 10 shows the procedure of the arbitration executed by each arbitration unit of the cross-bus switch apparatus in Embodiment 1 of the present invention.

The arbitration executed by each arbitration unit will be described with reference to FIG. 10.

(1) The arbitration process is in a wait state until any destination judgment unit notifies an arbitration unit of an issuance of a transfer request (step S1).

(2) When a transfer request is issued (when it is judged as yes in step S1), the arbitration unit judges whether a plurality of transfer requests have been issued (step S2).

(3) When a plurality of transfer requests are issued (when it is judged as yes in step S2), the arbitration unit either selects a bus switch connected to a master bus whose identification information is not stored in the storage unit 201, or selects a bus switch connected to a master bus out of the master buses whose identification information is stored in the storage unit 201 in accordance with the priority having been determined beforehand (step S3).

(4) When one transfer request is issued (when it is judged as no in step S2), the connection unit 203 turns ON a bus switch corresponding to the issued transfer request (step S4). Also, when a plurality of transfer requests are issued (when it is judged as yes in step S2), the connection unit 203 turns ON the bus switch selected in the step S3 (step S4).

(5) The rewriting unit 204 stores identification information of the master bus connected by the connection unit 203 into the storage unit 201 (step S5).

(6) The arbitration process is in a wait state until the transfer is completed (step S6).

(7) When the transfer is completed (when it is judged as yes in step S6), the connection unit 203 turns OFF all the bus switches connected to itself, then the control returns to step S1 (step S7).

Here, in the cross-bus switch apparatus in Embodiment 1 of the present invention, even if two or more source apparatuses connected to different source buses almost simultaneously issue data transfer requests for different destination buses, each arbitration unit corresponding to respective destination bus connects the requested source apparatus to the corresponding destination bus. Neither of the transfer requests waits for the execution.

Suppose, for example, that the following three transfer requests are issued simultaneously: a transfer request for a transfer from the data cache in the microcomputer unit 910 to the low-speed access main memory 934; a transfer request for a transfer from the DMA manager unit 911 to the peripheral I/O 935; and a transfer request for a transfer from the transport decoder unit 912 to the high-speed access main memory 933 such as an SDRAM. When this happens, the arbitration unit 122 for the lowspeed access main memory bus 932 turns ON the bus switch 124 to connect the data cache bus 902 to the low-speed access main memory bus 932, the arbitration unit 121 for the peripheral I/O bus 907 turns ON the bus switch 125 to connect the DMA bus 903 to the peripheral I/O bus 907, and the arbitration unit 141 for the high-speed access main memory bus 931 turns ON the bus switch 142 to connect the TD bus 904 to the high-speed access main memory bus 931.

Suppose, as another example, that a transfer request for a transfer from the instruction cache in the microcomputer unit 910 to the high-speed access main memory 933 such as an SDRAM. When this happens, the arbitration unit 123 for the connection bus 160 turns ON the bus switch 126 to connect the instruction cache bus 901 to the high-speed access main memory bus 931, and the arbitration unit 141 for the high-speed access main memory bus 931 turns ON the bus switch 143 to connect the connection bus 160 to the high-speed access main memory bus 931.

Also, in the cross-bus switch apparatus in Embodiment 1 of the present invention, when two or more source apparatuses connected to different source buses almost simultaneously issue data transfer requests for transfers that pass through the same destination bus, an arbitration unit corresponding to the destination bus selects a bus switch and allows the selected bus switch to connect a source bus to the destination bus while the other transfer requests not corresponding to the selected bus switch wait for execution, as described earlier.

Suppose, for example, that transfer requests for transfers to the high-speed access main memory 933 such as an SDRAM are issued from: the data cache in the microcomputer unit 910; the DMA manager unit 911; and the transport decoder unit 912. Then the arbitration unit 123 for the connection bus 160 selectively turns ON either the bus switch 127 or 128, allows the turned-on bus switch to connect either the data cache bus 902 or the DMA bus 903 to the connection bus 160. When this happens, the arbitration unit 141 for the high-speed access main memory bus 931 selectively turns ON either the bus switch 142 or 143 to connect either the connection bus 160 or the TD bus 904 to the high-speed access main memory bus 931.

The first point to be noted here is that the exclusive use rate of the destination bus connected to the sub-cross-bus switch unit 140 by the source bus connected to the main-cross-bus switch unit 120 is considerably lower than that by the source bus connected to the sub-cross-bus switch unit 140. In the present example, since it is presumed that each arbitration unit selects the bus switches on a substantially even basis, the exclusive use rate of the high-speed access main memory bus 931 by the TD bus 904 is ½; and the exclusive use rate of the high-speed access main memory bus 931 by each of the source buses 901 to 903 is ⅙.

This means that the exclusive use rate of the source bus can be changed by changing the construction of the cross-bus switch unit in the cross-bus switch apparatus, even though such a relatively simple arbitration unit as to select objects on a substantially even basis is used.

Especially, in an apparatus, such as a DBR, which deals with stream data, a certain amount of stream data needs to be secured lest the reproduction of video images or the like is interrupted. Therefore, the exclusive use rate of a bus, such as the TD bus, which is used to transfer stream data needs to be increased. For this purpose, conventional DBRs use such relatively complicated arbitration circuits as to select objects at different rates, while the DBR using the cross-bus switch apparatus in Embodiment 1 of the present invention increases the exclusive use rate of the TD bus even though such a relatively simple arbitration unit as to select objects on a substantially even basis is used.

One might think that such a two-stage arbitration may take a longer time than conventional arbitrations. However, it can be said that the two-stage arbitration provides a sufficient effect if a merit of increasing the operating frequency is larger than a demerit of adding one extra clock. For example, presume that the number of clocks is 3 (receiving of a data transfer request+arbitration+transfer to a slave) and the operating frequency is 80 MHz in a cross-bus switch unit with a single-stage arbitration. When this happens, the time taken for the cross-bus operation is $3 \times (\frac{1}{80}M) = 37.5$ ns. Presume also that the number of clocks is 4 (receiving of a data transfer request by a main-cross-bus switch unit+arbitration by the main-cross-bus switch unit and receiving of a data transfer request by a sub-cross-bus switch unit+arbitration by a sub-cross-bus switch unit+ transfer to a slave) and the operating frequency is 120 MHz in the cross-bus switch apparatus in Embodiment 1 of the present invention with a two-stage arbitration. When this happens, the time taken for the cross-bus operation is $4 \times (\frac{1}{120}M) = 33.3$ ns. This shows that the two-stage arbitration provides a sufficient effect. Also, even if the two-stage arbitration takes longer time than the single-stage arbitration, an effect may be obtained on the whole since the overall operating frequency of the cross-bus switch apparatus with the two-stage arbitration is higher than that with the single-stage arbitration.

As apparent from the above description, the cross-bus switch apparatus with the two-stage arbitration in Embodiment 1 of the present invention has improved wiring efficiency and increased operating frequency by dividing one circuit into two circuits while maintaining the same function as a cross-bus switch unit with a single-stage arbitration.

Embodiment 2

The cross-bus switch apparatus in Embodiment 2 of the present invention uses an SDRAM as the high-speed access main memory in Embodiment 1. Also, the sub-cross bus switch unit of the present embodiment includes a slave bus corresponding to each bank of the SDRAM so that each bank can be connected to a master bus.

<Construction>

Figure 11:
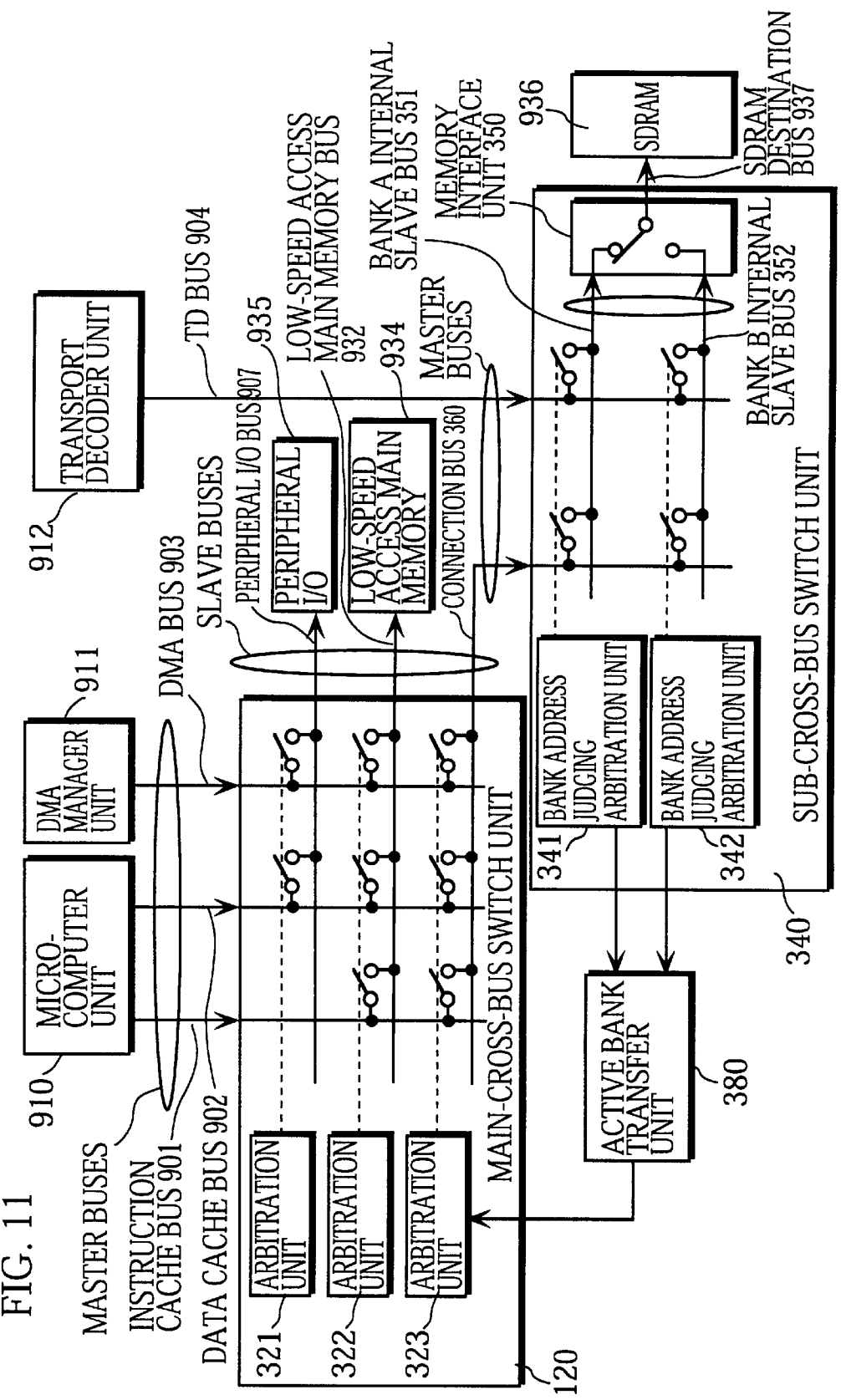
FIG. 11 shows a simplified construction of the cross-bus switch apparatus in Embodiment 2 of the present invention.

FIG. 11 shows a simplified construction of the cross-bus switch apparatus in Embodiment 2 of the present invention. The drawing also shows units connected to the cross-bus switch apparatus.

The cross-bus switch apparatus in Embodiment 2 of the present invention includes a main-cross-bus switch unit 320, a sub-cross-bus switch unit 340, a connection bus 360, and an active bank transfer unit 380.

As shown in FIG. 11, the main-cross-bus switch unit 320 is connected to a set of master buses: the instruction cache bus 901, the data cache bus 902, and the DMA bus 903, and is connected to a set of slave buses: the peripheral I/O bus 907, the low-speed access main memory bus 932, and the connection bus 360. A bus switch is disposed for each possible combination of one master bus and one slave bus. With this construction, it is possible to select one master bus for each slave bus and connect the selected master bus to each corresponding slave bus. The main-cross-bus switch unit 320 also includes arbitration units 321 to 323 which, when two or more master buses, among a plurality of master buses connectable to a certain slave bus, simultaneously issue requests for a connection to the certain slave bus, selects one bus switch connected to the certain slave bus and allows the selected bus switch to connect one of the two or more master buses to the certain slave bus.

As shown in FIG. 11, the sub-cross-bus switch unit 340 is connected to an SDRAM destination bus 937 (as a destination bus) connected to an SDRAM 936, includes a set of slave buses: a bank A internal slave bus 351 corresponding to a bank A in the SDRAM 936; and a bank B internal slave bus 352 corresponding to a bank B in the SDRAM 936, includes a memory interface unit 350 which connects the SDRAM destination bus 937 to either of the slave buses 351 and 352, and is connected to a set of master buses: the TD bus 904; and the connection bus 360. The sub-cross-bus switch unit 340 includes a plurality of bus switches corresponding to all possible combinations of a master bus and a slave bus so that each bus switch can connect a master bus to a slave bus. With this construction, it is possible to select one master bus for each slave bus and connect the selected master bus to each corresponding slave bus. The sub-cross-bus switch unit 340 also includes bank address judging arbitration units 341 and 342 which each, when two or more master buses, among a plurality of master buses connectable to a certain slave bus, simultaneously issue requests for a connection to the certain slave bus, select one bus switch connected to the certain slave bus and allows the selected bus switch to connect one of the two or more master buses to the certain slave bus.

It should be noted here, as in the earlier example, that no bus switches are disposed between the TD bus 904 and the peripheral I/O bus 907, between the TD bus 904 and the low-speed access main memory bus 932, and between the instruction cache bus 901 and the peripheral I/O bus 907. This is because there is a possibility that the transport decoder unit 912 may be connected only to the bank A internal slave bus 351 and the bank B internal slave bus 352, and the instruction cache bus of the microcomputer unit 910 is not connected to the peripheral I/O bus 907.

The arbitration units 321 to 323 included in the main-cross-bus switch unit 320 for respective slave buses are not described here since they are the same as the arbitration units 121 to 123 in Embodiment 1.

The sub-cross-bus switch unit 340 includes bank address judging arbitration units 341 and 342 which respectively correspond to the bank A internal slave bus 351 and the bank B internal slave bus 352. Each of the arbitration units 341 and 342 refers to the bank address on each connectable master bus and recognizes respective banks to be connected to the connectable master buses. With this process, the arbitration units 341 and 342 each select either the internal slave bus 351 or 352 that corresponds to the bank recognized as the one to be connected, and connect the master buses to the slave buses. The other functions of the bank address judging arbitration units 341 and 342 are the same as the arbitration units 121 to 123 and 141.

The memory interface unit 350 included in the sub-cross-bus switch unit 340 connects the SDRAM destination bus 937 to one of the bank A internal slave bus 351 and the bank B internal slave bus 352 that corresponds to a currently active bank, and switches to the other internal slave bus as a bank corresponding to the other internal slave bus becomes active.

The connection bus connects two or more cross-bus switch units, and is a master bus to one or more sub-cross-bus switch units and is a slave bus to one or more main-cross-bus switch units. In the present embodiment, the connection bus 360 is a master bus for the sub-cross-bus switch unit 340 and is a slave bus for the main-cross-bus switch unit 320.

The active bank transfer unit 380 transmits the connection state of the bus switches in the sub-cross-bus switch unit 340 to the arbitration unit 323 which corresponds to the connection bus 360 and the sub-cross-bus switch unit 340.

Here, the arbitration unit 323 of the main-cross-bus switch unit 320 further includes a function to determines a bank through a bank address. Using this function, the arbitration unit 323 achieves the following. When a plurality of master buses that are connectable to the connection bus issue a connection request for the connection bus, the arbitration unit 323, based on the connection state of the bus switches in the sub-cross-bus switch unit 340 transmitted from the active bank transfer unit 380, lowers the priority level of the currently used bank so that transfer requests for not-currently-used banks are given high priority levels.

Also, though not illustrated, a destination judgment unit disposed for each master bus judges a slave bus which is the destination of a transfer request and notifies a corresponding arbitration unit of the destination. With this construction, each arbitration unit can recognize an issuance of a transfer request.

<Operation>

The procedure of the arbitration performed by the cross-bus switch apparatus in Embodiment 2 will not be described here since it is the same as Embodiment 1.

As apparent from the above description, the cross-bus switch apparatus in Embodiment 2 of the present invention provides the following unique effects in addition to the effects provided in Embodiment 1. The present embodiment improves the parallel access to the banks in the SDRAM and improves transfer efficiency. These effects are achieved by a construction in which internal slave buses corresponding to banks in the SDRAM can be connected to different master buses, information indicating a bank currently accessed is transmitted from the sub-cross-bus switch unit to the main-cross-bus switch unit so that the main-cross-bus switch unit can be connected to the currently-accessed bank with precedence.

Embodiment 3

The cross-bus switch apparatus in Embodiment 3 of the present invention is characterized in that source buses connected to the master bus side are grouped into two source bus groups on a substantially even basis, the two source bus groups are connected as master buses to two main-cross-bus switch units, and connection buses as many as destination buses to be connected are connected as slave buses to two main-cross-bus switch units. The same connection buses being slave buses for the two main-cross-bus switch units are connected as master buses to each sub-cross-bus switch unit corresponding to a destination bus, and the destination buses are connected to each sub-cross-bus switch unit as slave buses. This construction enables a circuit to be divided into a plurality of circuits without impairing the function, improving wiring efficiency and increasing operating frequency.

<Construction>

Figure 12:
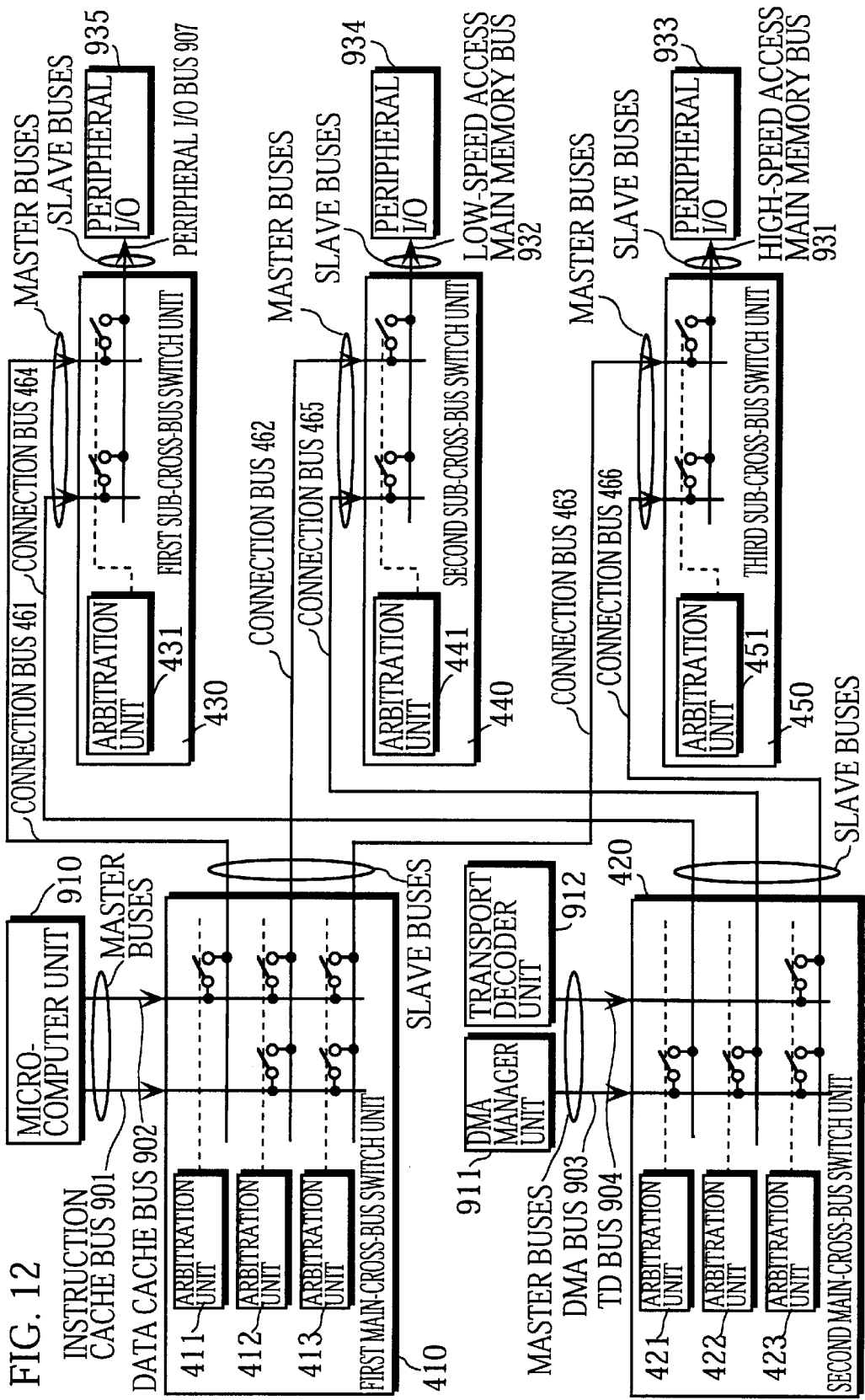
FIG. 12 shows a simplified construction of the cross-bus switch apparatus in Embodiment 3 of the present invention.

FIG. 12 shows a simplified construction of the cross-bus switch apparatus in Embodiment 3 of the present invention. The drawing also shows units connected to the cross-bus switch apparatus.

The cross-bus switch apparatus in Embodiment 3 of the present invention includes a first main-cross-bus switch unit 410, a second main-cross-bus switch unit 420, a first sub-cross-bus witch unit 430, a second sub-cross-bus switch unit 440, a third sub-cross-bus switch unit 450, and first to sixth connection buses 461 to 466.

As shown in FIG. 12, the first main-cross-bus switch unit 410 is connected to a set of master buses (the instruction cache bus 901 and the data cache bus 902), and is connected to a set of slave buses (the first to third connection buses 461 to 463). Also, the second main-cross-bus switch unit 420 is connected to a set of master buses (the DMA bus 903 and the TD bus 904), and is connected to a set of slave buses (the fourth to sixth connection buses 464 to 466).

Each of the first and second main-cross-bus switch units 410 and 420 includes a bus switch for each possible combination of one master bus and one slave bus respectively selected out of the bus groups. With this construction, it is possible to select one master bus for each slave bus and connect the selected master bus to each corresponding slave bus. Each of the first and second main-cross-bus switch units 410 and 420 also includes arbitration units 411 to 413 or 421 to 423 which, when two or more master buses, among a plurality of master buses connectable to a certain slave bus, simultaneously issue requests for a connection to the certain slave bus, selects one bus switch connected to the certain slave bus and allows the selected bus switch to connect one of the two or more master buses to the certain slave bus.

As shown in FIG. 12, each of the first to third sub-cross-bus switch units 430 to 450 is connected to connection buses (as master buses) which are respectively connected to the first and second main-cross-bus units 410 and 420, is connected to source buses (as slave buses). Each of the first to third sub-cross-bus switch units 430 to 450 includes a plurality of bus switches corresponding to all possible combinations of a master bus and a slave bus so that each bus switch can connect a master bus to a slave bus. With this construction, it is possible to select one master bus for each slave bus and connect the selected master bus to each corresponding slave bus. Each of the first to third sub-cross-bus switch units 430 to 450 also includes an arbitration unit 431, 441, or 451 which, when two or more master buses, among a plurality of master buses connectable to a certain slave bus, simultaneously issue requests for a connection to the certain slave bus, selects one bus switch connected to the certain slave bus and allows the selected bus switch to connect one of the two or more master buses to the certain slave bus.

More specifically, the first sub-cross-bus switch unit 430 is connected to the first and fourth connection buses 461 and 464 as master buses, and is connected to the peripheral I/O bus 907 as a slave bus; the second sub-cross-bus switch unit 440 is connected to the second and fifth connection buses 462 and 465 as master buses, and is connected to the low-speed access main memory bus 932 as a slave bus; and the third sub-cross-bus switch unit 450 is connected to the third and sixth connection buses 463 and 466 as master buses, and is connected to the high-speed access main memory bus 931 as a slave bus.

It should be noted here that no bus switches are disposed between the TD bus 904 and the peripheral I/O bus 907, between the TD bus 904 and the low-speed access main memory bus 932, and between the instruction cache bus 901 and the peripheral I/O bus 907. This is because there is a possibility that the transport decoder unit 912 may be connected only to the high-speed access main memory bus 931, and the instruction cache bus 901 of the microcomputer unit 910 is not connected to the peripheral I/O bus 907.

The arbitration units which are provided in the main-and sub-cross-bus switch units and correspond to slave buses will not be described here since they are the same as Embodiment 1.

Also, each arbitration unit can recognize an issuance of a transfer request since a destination slave bus of a transfer request is identified by a transfer request destination judgment unit provided for each master bus, and information indicating the identified destination slave bus is transmitted to a corresponding arbitration unit.

<Operation>

The procedure of the arbitration performed by each arbitration unit of the cross-bus switch apparatus in Embodiment 3 will not be described here since it is the same as Embodiment 1.

As apparent from the above description, the cross-bus switch apparatus in Embodiment 3 includes two circuits divided from one circuit without impairing the function. This improves wiring efficiency and increases operating frequency.

In Embodiments 1 and 2, one sub-cross-bus switch unit is used. However, two or more sub-cross-bus switch units may be used.

In Embodiment 3, source buses connected to the master bus side are grouped into two source bus groups. However, source buses may be grouped into three or more source bus groups, and as many main-cross-bus switch units as the number of source bus groups may be provided.

In Embodiment 3, one slave bus is connected to each sub-cross-bus switch unit. However, two or more slave buses may be connected to each sub-cross-bus switch unit.

The buses shown in Embodiments 1 to 3 are shown as examples although any types of buses may be used. Also, the number of the units such as the main-cross-bus switch units, sub-cross-bus switch units, source buses, destination buses, connection buses, etc may be other than those shown in each embodiment. Especially, in Embodiments 1 and 2, only a TD bus as a source bus is connected to the master side of the sub-cross-bus switch unit. However, the TD bus may be replaced with any kind of buses in any number. In short, the object of the present invention is attained by any construction as far as a plurality of cross-bus switch units are provided and they are connected through connection buses.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A cross-bus switch apparatus operable to connect master buses on a bus connection requesting side to slave buses on a bus connection requested side, the cross-bus switch apparatus comprising:

a first-layer cross-bus switch unit;

N second-layer cross-bus switch units;

N connection buses;

a plurality of source buses; and a plurality of destination buses, N being an integer equal to or larger than 1, wherein the N connection buses, which are each operable to connect the first-layer cross-bus switch unit to corresponding one of the N second-layer cross-bus switch units directly, are each connected as a slave bus to the first-layer cross-bus switch unit, and are each connected as a master bus to the corresponding one of the N second-layer cross-bus switch units, each of the plurality of source buses is connected to one or more source apparatuses on a data transfer requesting side, and is connected to the first-layer cross-bus switch unit and one of the N second-layer cross-bus switch units, each of the plurality of destination buses is connected to one or more destination apparatuses on a data transfer requested side, and is connected to the first-layer cross-bus switch unit and one of the N second-layer cross-bus switch units, the first-layer cross-bus switch unit is connected to a set of source buses as a set of master buses, and is connected to a set of one or more destination buses and N connection buses as a set of slave buses, the first-layer cross-bus switch unit including arbitration means for each slave bus connected to the first-layer cross-bus switch unit, each of the N second-layer cross-bus switch units is connected to a set of one or more source buses and a connection bus as a set of master buses, and is connected to a set of one or more destination buses as a set of slave buses, each of the N second-layer cross-bus switch units including arbitration means for each slave bus connected thereto, and when two or more master buses connected to a cross-bus switch unit send requests to the cross-bus switch unit for a connection to a slave bus, an arbitration means corresponding to the requested slave bus selects one out of the two or more master buses and connects the selected master bus to the requested slave bus.

2. The cross-bus switch apparatus of claim 1, wherein each arbitration means selects master buses on a substantially even basis.

3. The cross-bus switch apparatus of claim 2, wherein each arbitration means includes:

storage means for storing identification information of a most recently connected master bus;

selection means for, when two or more master buses connected to the selection means send requests to the selection means for a connection to a slave bus corresponding to the selection means, selecting a master bus excluding master buses which are identified by identification information stored in the storage means;

connection means for connecting the master bus selected by the selection means to the requested slave bus; and rewriting means for storing identification information of the master bus connected by the connection means into the storage means.

4. The cross-bus switch apparatus of claim 1, wherein a source bus expected to have a high exclusive use rate is connected to one of the N second-layer cross-bus switch units.

5. The cross-bus switch apparatus of claim 4, wherein the source bus expected to have a high exclusive use rate and connected to one of the N second-layer cross-bus switch units is used for transferring stream data.

6. The cross-bus switch apparatus of claim 1, wherein at least one of the N second-layer cross-bus switch units includes:

a plurality of internal slave buses respectively corresponding to a plurality of banks in a memory;

a memory-dedicated destination bus connected to the memory; and a memory interface for connecting the memory-dedicated destination bus to one of the plurality of internal slave buses corresponding to a currently active bank, and switching from the internal slave bus to another internal slave bus when a bank corresponding to the other internal slave bus becomes active, wherein each of the arbitration means included in the at least one of the N second-layer cross-bus switch units corresponds to an internal slave bus and refers to bank addresses on master buses and selects, as targets of connection to slave buses, master buses whose bank addresses match a bank address of a bank corresponding to the internal slave bus for the arbitration means.

7. The cross-bus switch apparatus of claim 6, wherein the at least one second-layer cross-bus switch unit including the memory interface further includes:

active bank transfer means for transmitting information on connection state of buses in the at least one second-layer cross-bus switch unit to arbitration means of the first-layer cross-bus switch unit that corresponds to the at least one second-layer cross-bus switch unit, wherein the arbitration means of the first-layer cross-bus switch unit that corresponds to the at least one second-layer cross-bus switch unit, when a plurality of master buses connected to a connection bus corresponding to the arbitration unit issue a connection request for the connection bus, selects, based on a connection state of bus switches in the N second-layer cross-bus switch units transmitted from the active bank transfer means that corresponds to the at least one second-layer cross-bus switch unit, one among the plurality of master buses and connects the connection bus to the selected master bus.

8. A cross-bus switch apparatus operable to connect master buses on a bus connection requesting side to slave buses on a bus connection requested side, the cross-bus switch apparatus comprising:

a plurality of first-layer cross-bus switch units;

one or more second-layer cross-bus switch units;

or more connection buses;

a plurality of source buses; and a plurality of destination buses, wherein the one or more connection buses which are each operable to connect one of the plurality of first-layer cross-bus switch units to one of the one or more second-layer cross-bus switch units directly, are each connected as a slave bus to the first-layer cross-bus switch unit, and are each connected as a master bus to the second-layer cross-bus switch unit, each of the plurality of source buses is connected to one or more source apparatuses on a data transfer requesting side, and is connected to one of the plurality of first-layer cross-bus switch units, each of the plurality of destination buses is connected to one or more destination apparatuses on a data transfer requested side, and is connected to one of the one or more second-layer cross-bus switch units, the plurality of first-layer cross-bus switch units are each connected to a set of one or more source buses as a set of master buses, and are each connected to a set of one or more connection buses as a set of slave buses, each of the plurality of first-layer cross-bus switch units including arbitration means for each slave bus connected to the first-layer cross-bus switch unit, each of the one or more second-layer cross-bus switch units is connected to a connection bus as a master bus, the connection bus being connected as a slave bus to a first-layer cross-bus switch unit, is connected to a destination bus as a slave bus, each of the one or more second-layer cross-bus switch units including arbitration means for each slave bus connected thereto, and when two or more master buses connected to a cross-bus switch unit send requests to the cross-bus switch unit for a connection to a slave bus, an arbitration means corresponding to the requested slave bus selects one out of the two or more master buses and connects the selected master bus to the requested slave bus.

9. The cross-bus switch apparatus of claim 8, wherein each of the plurality of first-layer cross-bus switch units is connected to one of source bus groups which are generated by dividing the plurality of source buses on a substantially even basis.

10. A cross-bus switch apparatus operable to connect master buses on a bus connection requesting side to slave buses on a bus connection requested side, the cross-bus switch apparatus comprising:

a plurality of first-layer cross-bus switch units;

a plurality of second-layer cross-bus switch units;

a plurality of (M−1)-layer cross-bus switch units; one or more M-layer cross-bus switch units;

one or more connection buses;

a plurality of source buses; and a plurality of destination buses, M being an integer equal to or larger than 3, wherein the one or more connection buses which are each operable to directly connect two cross-bus switch units of layers being different by one in layer number, are each connected as a slave bus to a cross-bus switch unit of a smaller-number layer among the two cross-bus switch units, and are each connected as a master bus to a cross-bus switch unit of a larger-number layer among the two cross-bus switch units, each of the plurality of source buses is connected to one or more source apparatuses on a data transfer requesting side, and is connected to one of the plurality of first-layer cross-bus switch units, each of the plurality of destination buses is connected to one or more destination apparatuses on a data transfer requested side, and is connected to one of the one or more M-layer cross-bus switch units, the plurality of first-layer cross-bus switch units are each connected to a set of one or more source buses as a set of master buses, and are each connected to a set of one or more connection buses as a set of slave buses, each of the plurality of first-layer cross-bus switch units including arbitration means for each slave bus connected to the first-layer cross-bus switch unit, each of the second- to (M−1)-layer cross-bus switch units is connected to a connection bus as a master bus, the connection bus being connected as a slave bus to a cross-bus switch unit of a layer having a number smaller than a layer of the cross-bus switch unit of interest by one, is connected to a set of one or more connection buses as a set of slave buses, each of the second- to (M−1)-layer cross-bus switch units including arbitration means for each slave bus connected thereto, and when two or more master buses connected to a cross-bus switch unit send requests to the cross-bus switch unit for a connection to a slave bus, an arbitration means corresponding to the requested slave bus selects one out of the two or more master buses and of connects the selected master bus to the requested slave bus.

11. The cross-bus switch apparatus of claim 10, wherein each of the plurality of first-layer cross-bus switch units is connected to one of source bus groups which are generated by dividing the plurality of source buses on a substantially even basis.

12. A system LSI including a cross-bus switch apparatus operable to connect master buses on a bus connection requesting side to slave buses on a bus connection requested side, the cross-bus switch apparatus comprising:

a first-layer cross-bus switch unitss;

N second-layer cross-bus switch units;

N connection buses;

a plurality of source buses; and a plurality of destination buses, N being an integer equal to or larger than 1, wherein the N connection buses, which are each operable to connect the first-layer cross-bus switch unit to the corresponding one of the N second-layer cross-bus switch units directly, are each connected as a slave bus to the first-layer cross-bus switch unit, and are each connected as a master bus to the corresponding one of the N second-layer cross-bus switch units, each of the plurality of source buses is connected to one or more source apparatuses on a data transfer requesting side, and is connected to the first-layer cross-bus switch unit and one of the N second-layer cross-bus switch units, each of the plurality of destination buses is connected to one or more destination apparatuses on a data transfer requested side, and is connected to the first-layer cross-bus switch unit and one of the N second-layer cross-bus switch units, the first-layer cross-bus switch unit is connected to a set of source buses as a set of master buses, and is connected to a set of one or more destination buses and N connection buses as a set of slave buses, the first-layer cross-bus switch unit including arbitration means for each slave bus connected to the first-layer cross-bus switch unit, each of the N second-layer cross-bus switch units is connected to a set of one or more source buses and a connection bus as a set of master buses, and is connected to a set of one or more destination buses as a set of slave buses, each of the N second-layer cross-bus switch units including arbitration means for each slave bus connected thereto, and when two or more master buses connected to a cross-bus switch unit send requests to the cross-bus switch unit for a connection to a slave bus, an arbitration means corresponding to the requested slave bus selects one out of the two or more master buses and connects the selected master bus to the requested slave bus.

13. A digital broadcast receiver which includes a cross-bus switch apparatus operable to connect master buses on a bus connection requesting side to slave buses on a bus connection requested side, the cross-bus switch apparatus comprising:

a first-layer cross-bus switch unit;

N second-layer cross-bus switch units;

N connection buses;

a plurality of source buses; and a plurality of destination buses, wherein N is an integer equal to or larger than 1, the N connection buses are each operable to connect the first-layer cross-bus switch unit and one of the N second-layer cross-bus switch units directly, are each connected as a master bus to the N second-layer cross-bus switch units, and are each connected as a slave bus to the first-layer cross-bus switch unit, each of the plurality of source buses is connected to one or more source apparatuses on a data transfer requesting side, and is connected to one of the first-layer cross-bus switch unit and the N second-layer cross-bus switch units, each of the plurality of destination buses is connected to one or more destination apparatuses on a data transfer requested side, and is connected to one of the first-layer cross-bus switch unit and the N second-layer cross-bus switch units, the first-layer cross-bus switch unit is connected to a plurality of source buses as master buses, and is connected to one or more destination buses and N connection buses as slave buses, and is operable to connect a certain master bus among master buses connected to the first-layer cross-bus switch unit to a certain slave bus among slave buses connected to the first-layer cross-bus switch unit, and when a plurality of master buses connected to the first-layer cross-bus switch unit send requests to the first-layer cross-bus switch unit for a connection to a slave bus corresponding to the first-layer cross-bus switch unit, selects one master bus among the plurality of connected master buses and connects the selected master bus to the requested slave bus, wherein the first-layer cross-bus switch unit selects the plurality of connected master buses on a substantially even basis, each of the N second-layer cross-bus switch units is connected to one or more source buses and one connection bus as master buses, and is connected to one or more destination buses as slave buses, and is operable to connect a certain master bus among master buses connected to the second-layer cross-bus switch unit to a certain slave bus among slave buses connected to the second-layer cross-bus switch unit, and when a plurality of master buses connected to the second-layer cross-bus switch unit send requests to the second-layer cross-bus switch unit for a connection to a slave bus corresponding to the second-layer cross-bus switch unit, selects one master bus among the plurality of connected master buses and connects the selected master bus to the requested slave bus, wherein each N second-layer cross-bus switch unit selects the plurality of connected master buses on a substantially even basis, and a source bus with a high priority rank used for transferring stream data is connected to one of the N second-layer cross-bus switch units.

* * * * *

UNITED STATES PATENT AND TRADEMARK OFFICE
CERTIFICATE OF CORRECTION

PATENT NO. : 6,842,104 B1
DATED : January 11, 2005
INVENTOR(S) : Masataka Osaka et al.

It is certified that error appears in the above-identified patent and that said Letters Patent is hereby corrected as shown below:

Column 22,
Line 52, after the word "and" and before the word "connects" please delete the word "of".
Line 63, please delete "unitss" and insert -- units --.

Signed and Sealed this

Second Day of August, 2005

JON W. DUDAS
*Director of the United States Patent and Trademark Office*